(12) United States Patent
Hashimoto

(10) Patent No.: US 7,907,344 B2
(45) Date of Patent: Mar. 15, 2011

(54) VARIABLE DISPERSION COMPENSATOR AND METHOD OF CONTROLLING THE SAME

(75) Inventor: Naoki Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 12/488,667

(22) Filed: Jun. 22, 2009

(65) Prior Publication Data

US 2010/0020405 A1 Jan. 28, 2010

(30) Foreign Application Priority Data

Jul. 25, 2008 (JP) ................. 2008-192391

(51) Int. Cl.
*G02B 27/12* (2006.01)
(52) U.S. Cl. ........................... 359/641; 359/260
(58) Field of Classification Search .................. 359/641, 359/260
See application file for complete search history.

(56) References Cited

U.S. PATENT DOCUMENTS

| 2004/0109637 | A1 |   | 6/2004 | Sugawara |         |
|--------------|----|---|--------|----------|---------|
| 2006/0013529 | A1 |   | 1/2006 | Sugawara et al. | |
| 2007/0147840 | A1 |   | 6/2007 | Sugawara et al. | |
| 2009/0123165 | A1 | * | 5/2009 | Hashimoto et al. | ........... 398/192 |

FOREIGN PATENT DOCUMENTS

| JP | 2003-264505 | 9/2003 |
| JP | 2004-191521 | 7/2004 |
| JP | 2006-221075 | 8/2006 |
| JP | 2007-171770 | 7/2007 |
| JP | 2007-298968 | 11/2007 |

* cited by examiner

*Primary Examiner* — Ricky L Mack
*Assistant Examiner* — James C Jones
(74) *Attorney, Agent, or Firm* — Stass & Halsey LLP

(57) ABSTRACT

In order to perform dispersion compensation for an optical signal of light introduced from an input light collimator, a variable dispersion compensator includes: a group delay characteristic control unit which controls group delay characteristics at a group delay characteristic assignment unit; a positioning unit which positions a relative positional relationship between an optical axis position and an output light collimator in the case where the light from the input light collimator is output to an output light collimator through reflection on each of incident side planes of a plurality of reflective etalons; and a positioning control unit which controls the positioning unit so that the relative positional relationship becomes a positional relationship set in association with the group delay characteristics controlled by the group delay characteristic control unit, and minimizes loss deterioration in the case of changing the amount of dispersion compensation.

18 Claims, 17 Drawing Sheets

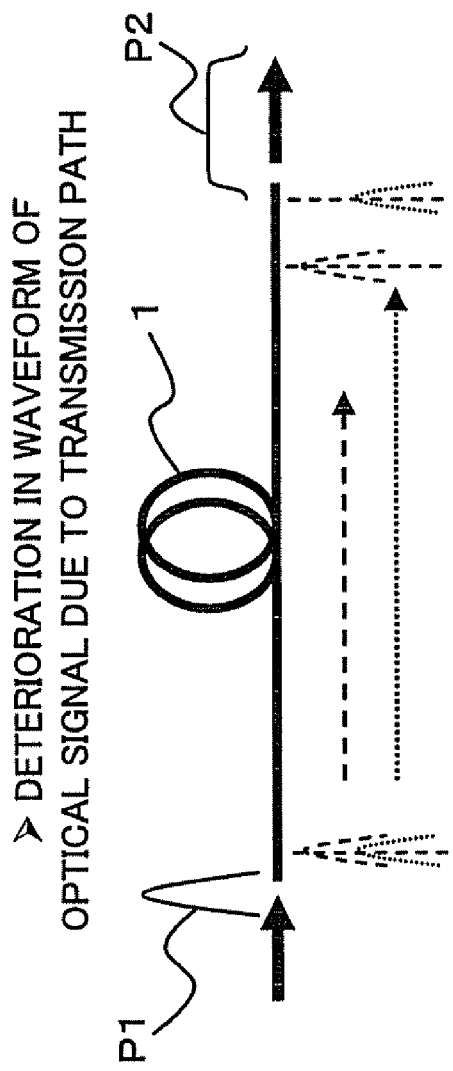
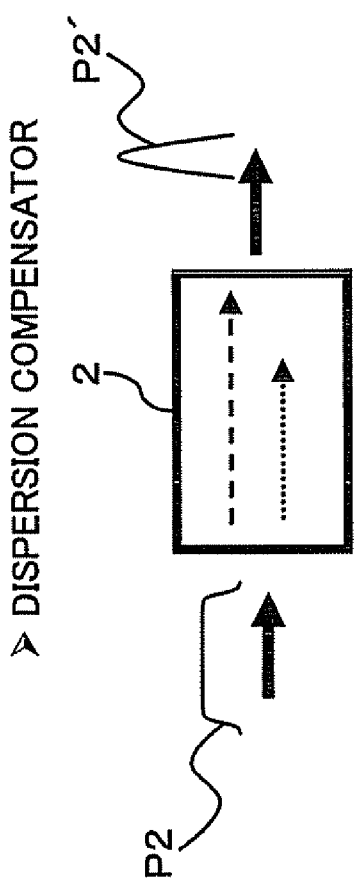

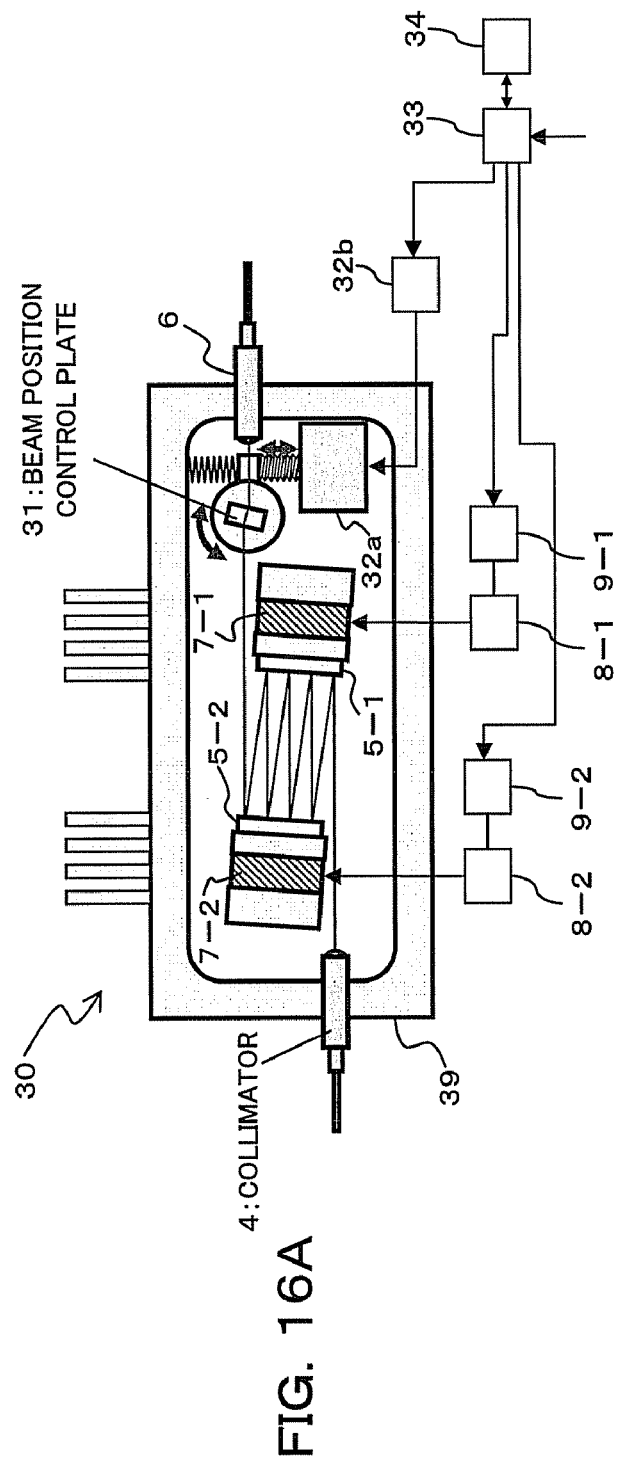
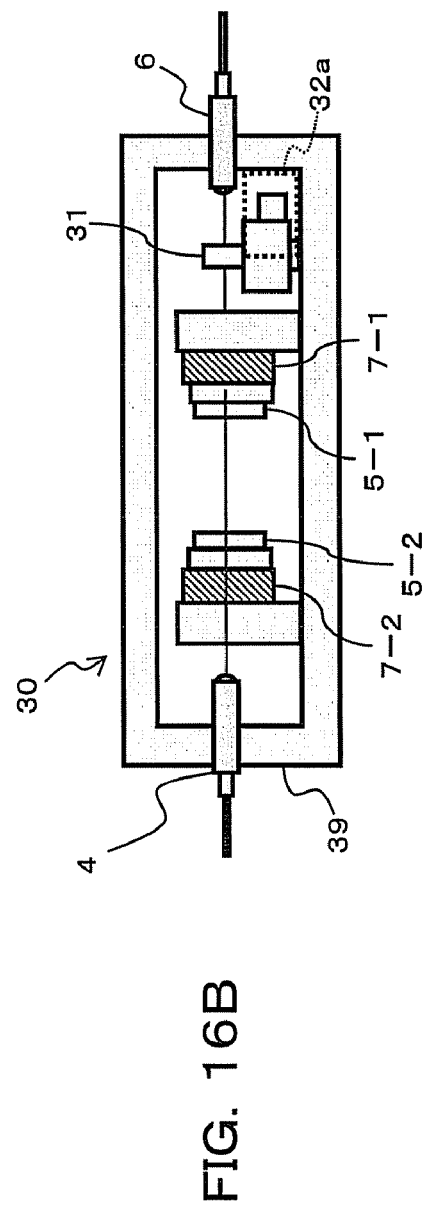
FIG. 16A
FIG. 16B

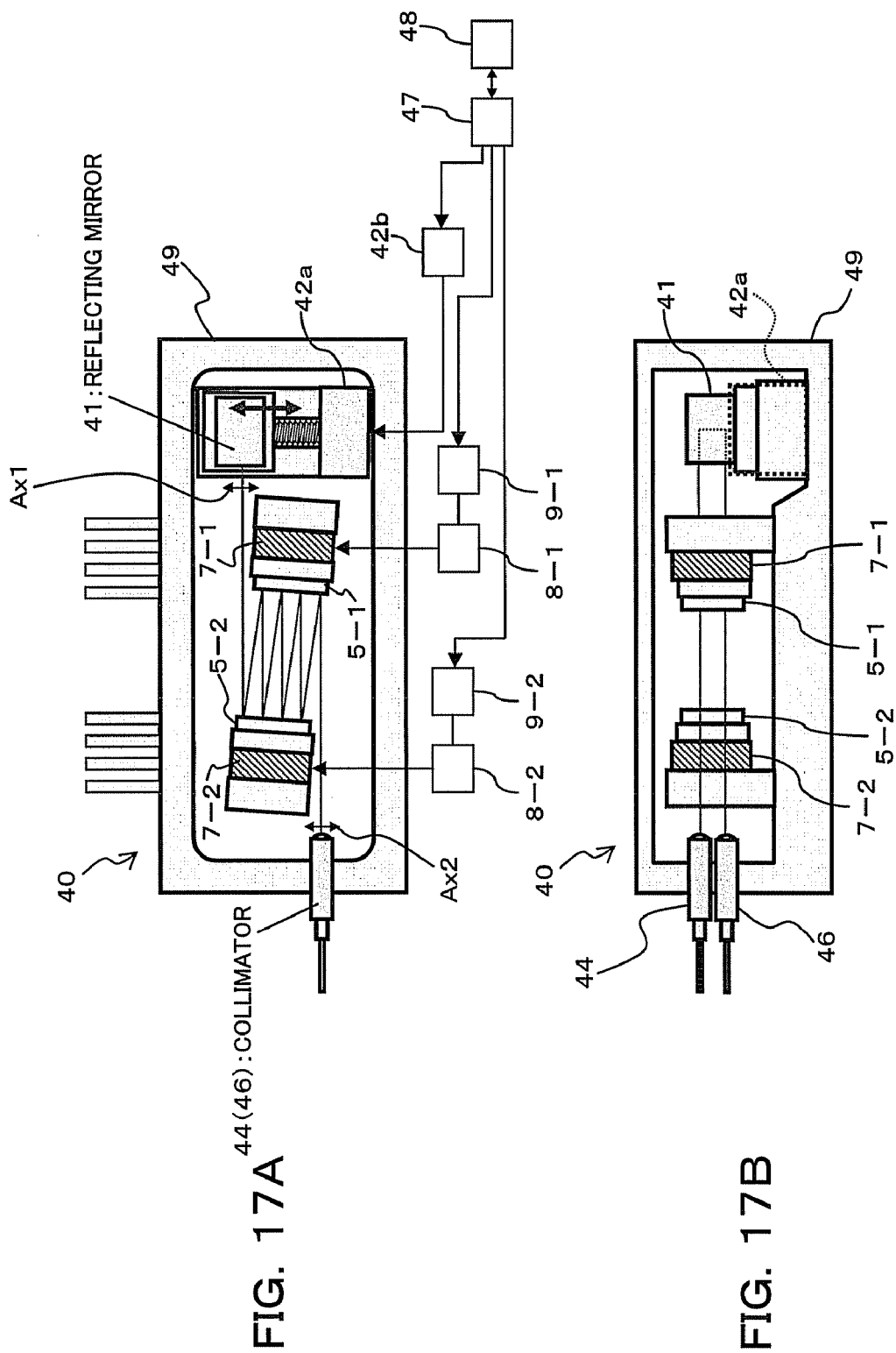

VARIABLE DISPERSION COMPENSATOR AND METHOD OF CONTROLLING THE SAME

CROSS-REFERENCE TO RELATED APPLICATION(S)

This application is based upon and claims the benefit of priority of the prior Japanese Patent Application No. 2008-192391, filed on Jul. 25, 2008, the entire contents of which are incorporated herein by reference.

FIELD

The embodiment(S) discussed herein is (are) related relates to a variable dispersion compensator and a method of controlling the same, both of which are suitable for use in optical communication systems.

BACKGROUND

As exemplified in FIG. 1A, in optical signal transmission using an optical fiber 1 serving as a transmission path, optical propagation velocity is different depending on its wavelength; therefore, distortion of a signal pulse increases in proportion to transmission distance. In FIG. 1A, when an optical pulse P1 on the transmission side is transmitted through the optical fiber 1, the optical pulse P1 becomes an optical pulse P2 as a result of pulse distortion generated by wavelength dispersion of the optical fiber 1.

This phenomenon is called wavelength dispersion, and has a deep impact on the quality of optical signals in recent optical communication systems which have remarkably higher bit rates. Single mode fiber (hereinafter, referred to as SMF) generally used for the optical communication system at present has a wavelength dispersion of approximately 15 to 17 ps/nm·km near a wavelength of 1550 nm. That is, the optical pulse transmitted for 100 km using the SMF receives a dispersion of approximately 1500 ps/nm, and a difference is generated in reach time for each wavelength component within a signal pulse band.

Wavelength dispersion compensation (hereinafter, referred to as dispersion compensation) is to regenerate the original signal waveform form the optical signals distorted by the influence of the wavelength dispersion, by giving wavelength dispersion of inverse sign against a transmission path to the distorted optical signal. For example, in a dispersion compensator 2 illustrated in FIG. 1B, an optical pulse P2' which has almost the same waveform to the original signal waveform (P1) is regenerate by giving the wavelength dispersion inverse to the transmission path 1 to the distorted optical pulse P2. At present, the one used most commonly in the present dispersion compensation is dispersion compensating fiber (hereinafter, referred to as DCF).

The DCF is a fiber designed to have dispersion inverse to an ordinary SMF by a special refractive index distribution. In the case of performing long distance optical transmission, a relay node is provided each at a predetermined distance, the DCF is connected thereto, and the DCF is used so that the total amount of dispersion becomes nearly zero.

On the other hand, a super high speed transmission system such as those at 40 Gbit/sec or 100 Gbit/sec has been introduced in order to meet rapidly increasing in communication demands in recent years. In such high bit rate transmission system, dispersion tolerance has been further reduced than that in conventional systems because of its wide signal band; therefore, it is considered that fluctuation in temperature of wavelength dispersion which has not been a problem conventionally needs to be compensated.

Consequently, in such a high speed transmission system of 40 G or more, in addition to a fixed DCF, a variable dispersion compensator which can arbitrarily control the amount of dispersion compensation is considered to be essential in order to compensate for a residual dispersion component which cannot be compensated by the DCF. Hitherto, various kinds of variable dispersion compensators have been proposed.

In the variable dispersion compensators, it is desired to improve device performances in every aspect, such as improvement in accuracy of dispersion compensation and suppression of insertion loss as well as reduction in device size.

(Patent Document 1) Japanese Patent Application Laid-Open No. 2003-264505
(Patent Document 2) Japanese Patent Application Laid-Open No. 2007-298968
(Patent Document 3) Japanese Patent Application Laid-Open No. 2006-221075

SUMMARY OF THE INVENTION

For example, the followings are aspects of the embodiments.

(1) A variable dispersion compensator which includes: an input light collimator which introduces input light; a group delay characteristic assignment unit in which a plurality of reflective etalons are arranged in face-to-face relation so as to form an optical path by reflection for light introduced from the input light collimator, and which assigns variable group delay characteristics to the light by reflection on the plurality of the reflective etalons; an output light collimator which receives the light to which the variable group delay characteristics are assigned by the group delay characteristic assignment unit; a group delay characteristic control unit which controls the group delay characteristics at the group delay characteristic assignment unit in order to perform dispersion compensation for an optical signal of the light introduced from the input light collimator; a positioning unit which positions a relative positional relationship between an optical axis position and the output light collimator in the case where the light from the input light collimator is output toward the output light collimator through reflection on each of incident side planes of the plurality of the reflective etalons; and a positioning control unit which controls the positioning unit so that the relative positional relationship becomes a positional relationship set in association with the group delay characteristics controlled by the group delay characteristic control unit can be used.

(2) A variable dispersion compensator which includes: an input light collimator which introduces input light; a group delay characteristic assignment unit in which a reflective etalon is arranged so as to form an optical path by reflection for light introduced from the input light collimator, and which assigns variable group delay characteristics to the light by reflection on the reflective etalon; an output light collimator which receives the light to which the variable group delay characteristics are assigned by the group delay characteristic assignment unit; a group delay characteristic control unit which controls the group delay characteristics at the group delay characteristic assignment unit in order to perform dispersion compensation for an optical signal of the light introduced from the input light collimator; a positioning unit which positions a relative positional relationship between an optical axis position and the output light collimator in the case where the light from the input light collimator is output toward the output light collimator through reflection on an incident side plane of the reflective etalon; and a positioning control unit which controls the positioning unit so that the relative positional relationship becomes a positional relationship set in association with the group delay characteristics controlled by the group delay characteristic control unit can be used.

(3) A method of controlling a variable dispersion compensator which assigns group delay characteristics for dispersion compensation to light introduced from an input light collimator by reflection on a plurality of reflective etalons and leads the light to an output light collimator, the method including: controlling the group delay characteristics assigned by the plurality of the reflective etalons; and performing positioning control of a relative positional relationship between an optical axis position and the output light collimator in the case where the light from the input light collimator is output toward the output light collimator through reflection on each of incident side planes of the plurality of the reflective etalons in association with the controlled group delay characteristics can be used.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 1A is a diagram for explaining about wavelength dispersion, and FIG. 1B is a diagram for explaining about the function of a dispersion compensator;

FIGS. 16A and 16B are both diagrams illustrating a variable dispersion compensator of a third embodiment; and FIGS. 17A and 17B are both diagrams illustrating a variable dispersion compensator of a fourth embodiment.

DETAILED DESCRIPTION OF THE INVENTION

Hereinafter, embodiments will be described with reference to drawings. The embodiments to be described below are merely exemplifications, and it is not intended to exclude various modifications and application of technology that are not demonstrated below. That is, the present embodiments may be implemented by being diversely modified (for example, respective embodiments are combined) without departing from the spirit or scope of the present invention.

[A] First Embodiment

[A1] Comparative Example

Figure 2:
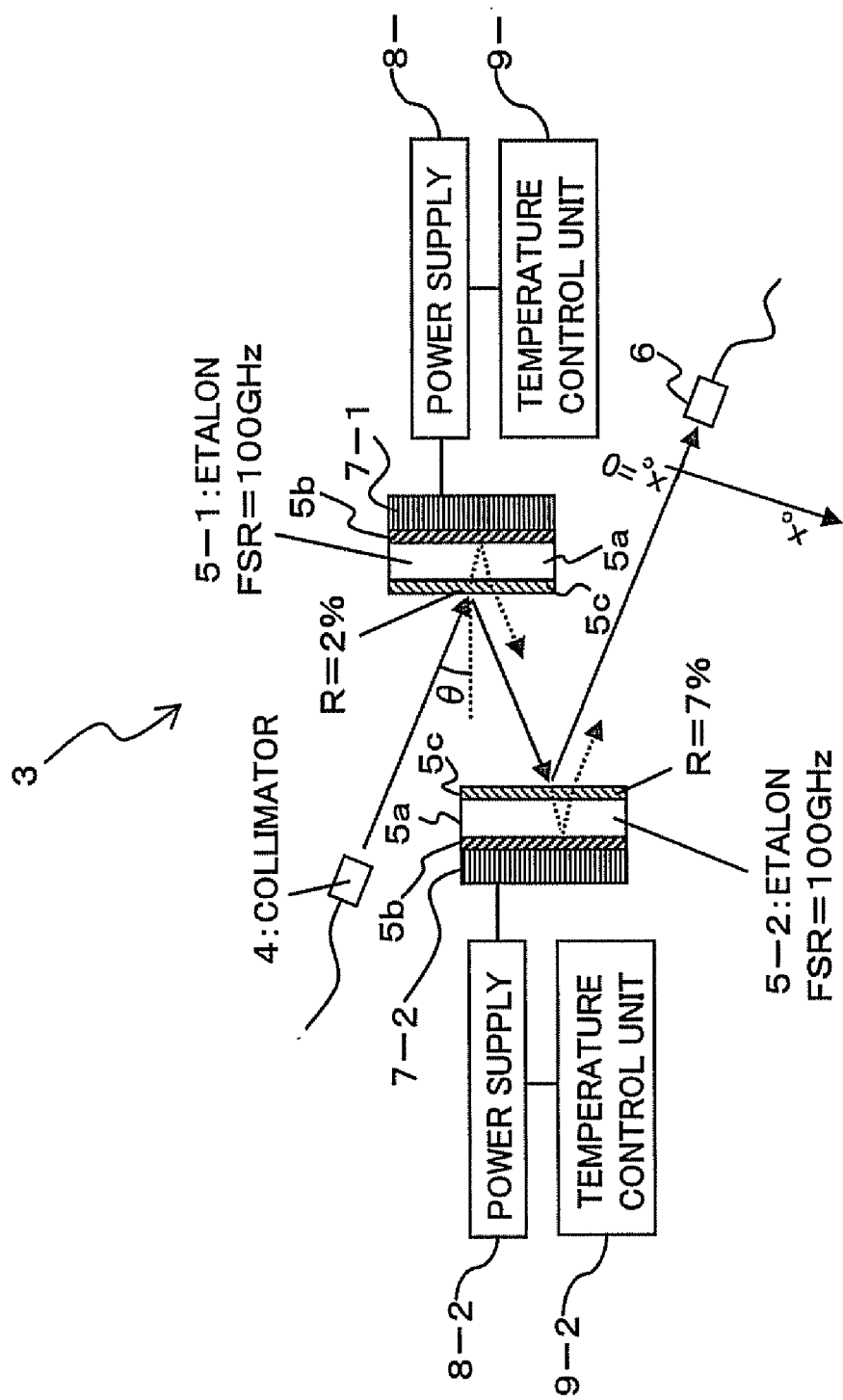
FIG. 2 is a diagram illustrating a variable dispersion compensator as a comparative example of the present embodiment.

FIG. 2 is a diagram illustrating a variable dispersion compensator as a comparative example of the present embodiment. A variable dispersion compensator 3 illustrated in FIG. 2 is one in which a plurality of etalons 5-1 and 5-2 having different characteristics are combined. The etalons 5-1 and 5-2 are both provided with reflective films 5b and 5c formed on both sides of tabular substrate 5a (of Etalon 5-1) and 5a (of Etalon 5-2). Then, one reflective film 5b has reflectance of about 100%; and the other reflective film 5c has reflectance lower than that of the reflective film 5b.

In this case, a free spectral range (FSR) of 100 GHz is assigned to both the etalons 5-1 and 5-2. Then, the etalon 5-1 is a relatively low finesse etalon having a reflectance R of the reflective film 5c set to 2%; and the etalon 5-2 is a relatively high finesse etalon having a reflectance R of the reflective film 5c set to 7%. These etalons 5-1 and 5-2 are arranged in face-to-face relation so as to be substantially parallel (including error range within tolerance) on an optical path of light introduced from an input light collimator 4. (The value of the FSR and values of the reflectance of the etalons are merely an example.)

This allows light from the input light collimator 4 to be made incident on and reflected on the respective etalons 5-1 and 5-2 in order at an incident angle of $\theta=2°$ and introduced to an output light collimator 6. Furthermore, peltiert elements 7-1 and 7-2 are coupled to the etalons 5-1 and 5-2, respectively. In addition, power supplies 8-1 and 8-2 apply a current to the peltiert elements 7-1 and 7-2. Temperature control units 9-1 and 9-2 control temperature of the etalons 5-1 and 5-2 by controlling the amount of the current and a direction of the current applied to the peltiert elements 7-1 and 7-2 by the power supplies 8-1 and 8-2.

Figure 3:
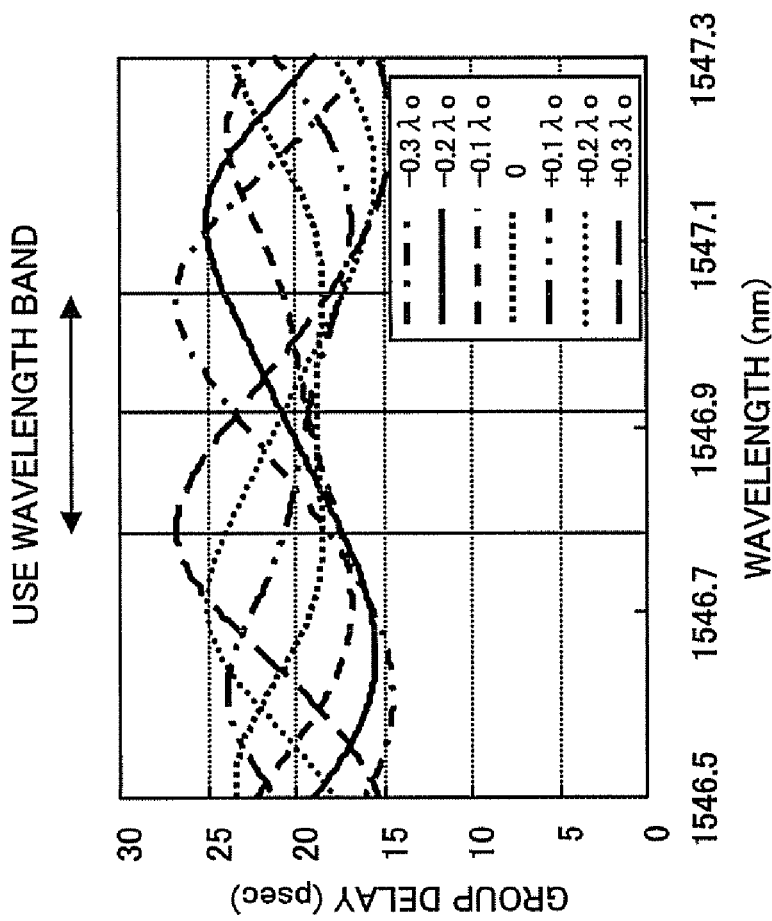
FIG. 3 is a diagram for explaining about the function of the variable dispersion compensator as the comparative example.

FIG. 3 illustrates a change in synthesized group delay characteristics when group delay peak of the low finesse etalon (R=2%) is tuned with a wavelength grid and resonator length of the high finesse etalon (R=7%) is changed. In FIG. 3, the degree of change in resonator length is represented by how many times as large as the center grid wavelength (in this case, 1546.917 nm) the thickness of the etalon 5-2 is changed by using the thickness of the etalon 5-2 in the case where wavelength dispersion characteristics at a use wavelength band in the etalons 5-1 and 5-2 become 0 nm/ps as a reference (0)

Figure 4:
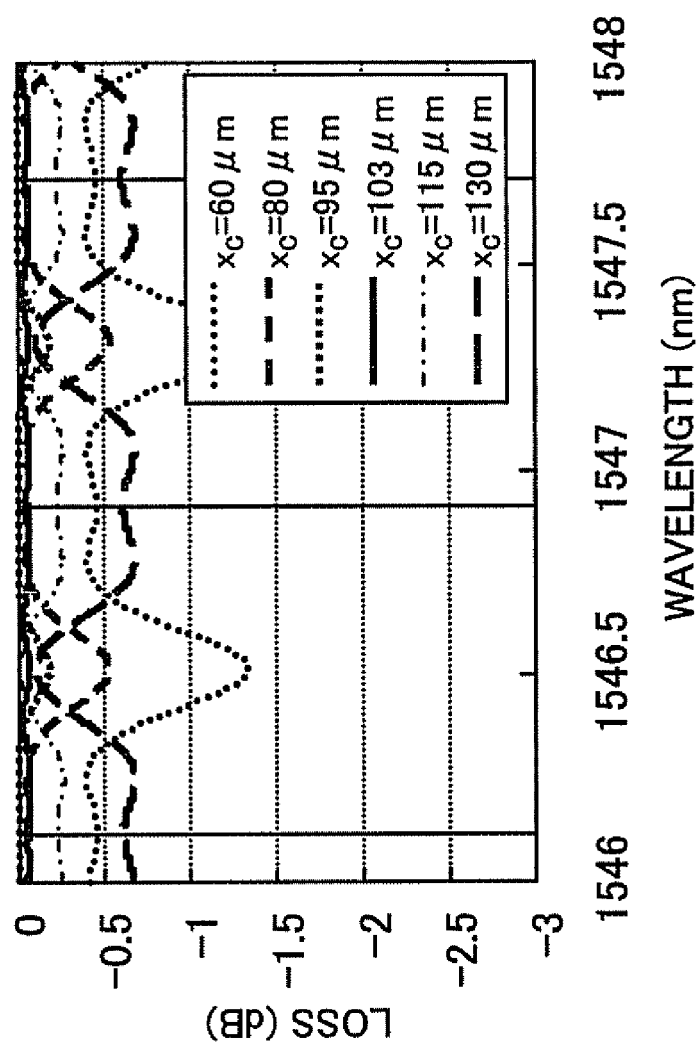
FIG. 4 is a diagram for explaining about the function of the variable dispersion compensator as the comparative example.

In such an optical system having a plurality of etalons 5-1 and 5-2, there is a close relationship between a position of the output light collimator 6, and insertion loss or loss ripple. FIG. 4 illustrates a relationship between spectrum and loss for the case where a position $x_c$ of the output light collimator 6 is varied when the amount of dispersion compensation is 0 ps/nm (see the case of "0" illustrated in FIG. 3) in the configuration illustrated in FIG. 2. In this case, beam radii of the input light collimator 4 and the output light collimator 6 are set to 100 μm.

About the position $x_c$ of the output light collimator 6, a direction perpendicular to an output light beam and away from an input light collimator position within a light incident plane with respect to a reference position ($x_c$=0) is set as a plus direction. The reference position in this case is a beam reach position in the case where reflectance at the light incident plane 5c of the etalons 5-1 and 5-2 is assumed as 100%.

As illustrated in FIG. 4, in the case where the amount of dispersion compensation is set to 0 ps/nm in the configuration illustrated in FIG. 2, it can be seen that the loss ripple becomes the smallest when the position $x_c$ of the output light collimator 6 is 103 μm, and the loss at a wavelength grid (1546.917 nm) becomes the smallest in the case of $x_c \approx 95$ μm.

Figure 5A:
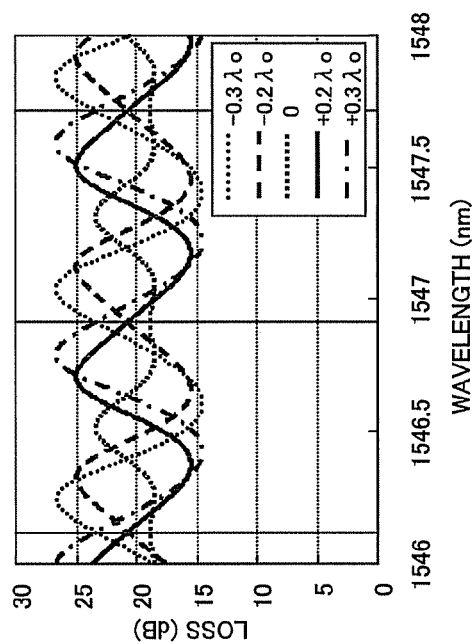
FIGS. 5A and 5B are both diagrams for explaining about the function of the variable dispersion compensator as the comparative example.
Figure 5B:
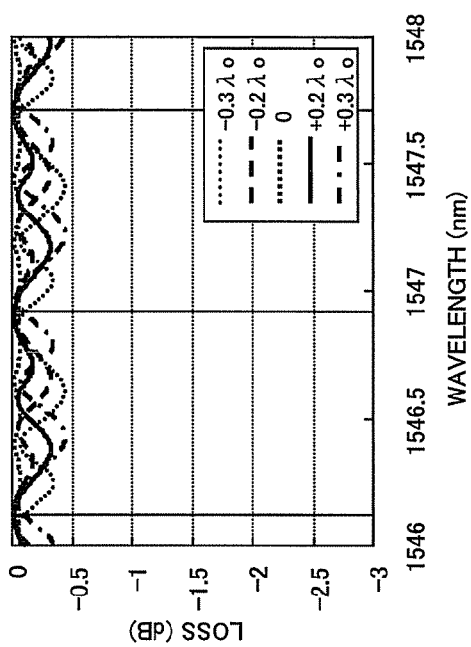

Next, in the dispersion compensator 3 illustrated in FIG. 2, consider a change in loss spectrum in the case of changing the amount of compensation. The output light collimator 6 is fixed to the position ($x_c \approx 103$ μm) at which the loss ripple becomes the smallest in the case where the amount of compensation is 0 ps/nm, and resonator length of the high finesse etalon 5-2 is made to change and tuning of the amount of compensation is performed. Group delay characteristics and change in loss spectrum in this case are illustrated in FIGS. 5A and 5B, respectively (characteristics illustrated in FIGS. 5A and 3 are substantially equivalent)

In this case, with the change in the group delay characteristics (dispersion characteristics), not only the loss characteristics are wavelength-shifted, but also ripple depth is changed. The loss ripple can be reduced when a light incident angle θ is reduced; however, the ripple depth is increased at the same time when the amount of compensation is changed, and consequently, the loss characteristics are deteriorated.

Furthermore, the more the incident angle θ is reduced, the more influence given by the beam radius become unignorable. That is, it is assumed that beam eclipse due to the edge of the etalon 5-1 is generated. In order to avoid such eclipse, an interval between the etalons 5-1 and 5-2 has to be widened. That is, in the case where the variable dispersion compensator 3 using the reflective etalons 5-1 and 5-2 is reduced in size, it is desirable that the light incident angle θ is large to some extent.

As described above, in the variable dispersion compensator 3 which adopts an oblique incident optical system using the reflective etalons 5-1 and 5-2, the input collimator 4, and the output collimator 6 as illustrated in FIG. 2, the loss characteristics are deteriorated when dispersion compensation characteristics are tuned by controlling the resonator length of the etalon 5-2 (and 5-1). On the other hand, it is conceivable that deterioration in loss characteristics is suppressed by reducing the light incident angle θ; however, the light incident angle θ is required to be large to some extent in order to achieve reduction in device size. Therefore, further technical progress is required in order to achieve both the reduction in device size and the suppression of deterioration in loss characteristics.

[A2] Variable Dispersion Compensator in First Embodiment

Figure 6:
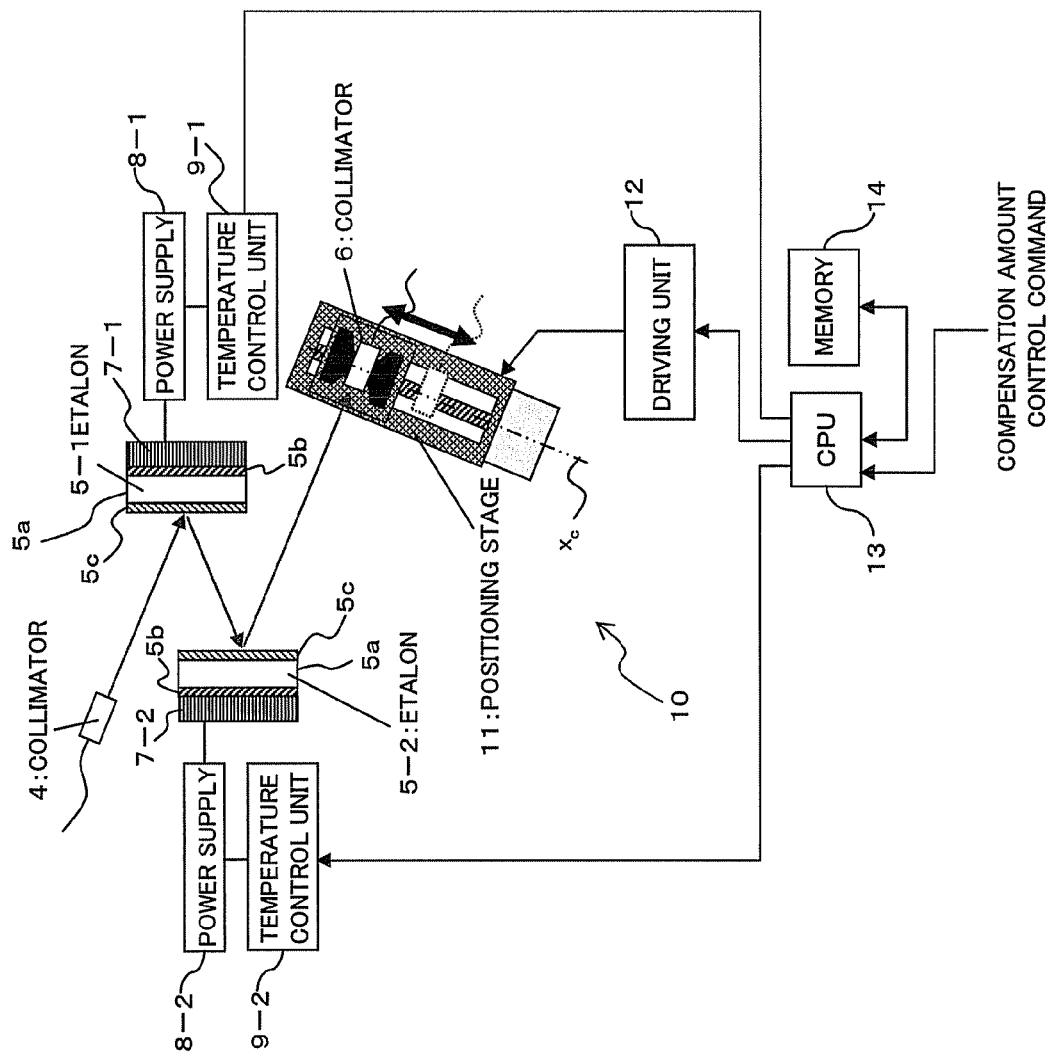
FIG. 6 is a diagram illustrating a variable dispersion compensator of a first embodiment.

A variable dispersion compensator 10 as exemplified in FIG. 6 is proposed in the first embodiment. The variable dispersion compensator 10 illustrated in FIG. 6 includes an input light collimator 4, etalons 5-1 and 5-2, an output light collimator 6, peltiert elements 7-1 and 7-2, power supplies 8-1 and 8-2, and temperature control units 9-1 and 9-2 similarly to the aforementioned variable dispersion compensator 3 illustrated in FIG. 2.

That is, input light is introduced to the etalon 5-1 in the input light collimator 4. The etalons 5-1 and 5-2 serving as a group delay characteristic assignment unit are arranged in face-to-face relation so as to form an optical path by reflection for light introduced from the input light collimator 4, and variable group delay characteristics are assigned to the introduced light by reflection on the etalons 5-1 and 5-2. Furthermore, the output light collimator 6 receives the light to which the group delay characteristics for dispersion compensation is assigned from the etalon 5-2 and outputs as light in which wavelength dispersion is compensated.

In FIG. 6, the light introduced from the input light collimator 4 is reflected once on the etalons 5-1 and 5-2, respectively, and then coupled to the output light collimator 6; however, the light may be reflected several times on the etalons 5-1 and 5-2.

In this case, the variable dispersion compensator 10 of the present embodiment is different from the variable dispersion compensator 3 illustrated in FIG. 2 in that the variable dispersion compensator 10 further includes a positioning stage 11, a driving unit 12, a central processing unit (hereinafter, referred to as CPU) 13, and a memory 14.

The positioning stage 11 receives driving control from the driving unit 12 and performs positioning of the output light collimator 6 by making the output light collimator 6 slide on an axis corresponding to the $x_c$ axis illustrated in FIG. 2. That is, an $x_c$ axis normal direction is set as a direction, which is in a light incident plane, in which the aforementioned point ($x_c$=0) is set as the original point, and which is orthogonal to the output optical beam and away from the optical axis of the input light collimator 4. Then, the positioning stage 11 is arranged so that the output light collimator 6 is positioned on any coordinate value in a normal direction from the original point of the aforementioned $x_c$ axis.

In addition, as the positioning stage 11, one which uses characteristics of a piezo element can be applicable in addition to one which is provided with a mechanical slide mechanism. In addition, the driving unit 12 is controlled by a CPU 13 (to be described later) to drive the positioning stage 11 in order to position the output light collimator 6.

Furthermore, the CPU 13 receives a command for controlling the amount of dispersion compensation as the variable dispersion compensator 10, and outputs the amount of control which is for obtaining the amount of dispersion compensation corresponding to the contents of the received command to the temperature control units 9-1 and 9-2. Temperature control information corresponding to the amount of dispersion compensation related to the command can be extracted by referring to the memory 14 or the like.

With this method, in the CPU 13, the group delay characteristics to be assigned to the etalons 5-1 and 5-2 are set through temperature control designation to the temperature control units 9-1 and 9-2; therefore, dispersion compensation corresponding to the command is achieved. In other words, the aforementioned CPU 13 and memory 14 are one example of a group delay characteristic control unit which controls the group delay characteristics at the etalons 5-1 and 5-2 in order to perform dispersion compensation for an optical signal of the light introduced from the input light collimator 4.

In addition, the aforementioned reflective etalons 5-1 and 5-2, peltiert elements 7-1 and 7-2, power supplies 8-1 and 8-2, and temperature control units 9-1 and 9-2 are one example of the group delay characteristic assignment unit which assigns the variable group delay characteristics to the optical signal introduced from the input light collimator 4 by reflection on the etalons 5-1 and 5-2.

Furthermore, the CPU 13 extracts information on the position at which the output light collimator 6 is positioned, from the memory 14 in association with the amount of dispersion compensation related to the command contents, and controls the driving unit 12 by the extracted information. The memory 14 stores information (for example, control information to the driving unit 12) on the arrangement position of the output collimator 6 which optimizes loss characteristics as to be described later, in association with a range of the group delay characteristics (that is, dispersion compensation characteristics) that can be assigned in the variable dispersion compensator 10.

With this method, the CPU 13 controls the output light collimator 6 to be positioned at the optimum position by controlling the driving unit 12 by the amount of control obtained by referring to the memory 14 according to the amount of dispersion compensation (group delay characteristics) corresponding to the command. A proper position of the output light collimator 6 is determined by a relative positional relationship with an optical axis position in the case where the light from the input light collimator 4 is output toward the output light collimator 6 through reflection on the incident side planes (reflective films 5c) of the etalons 5-1 and 5-2.

That is, a control signal from the CPU 13 to the driving unit 12 includes information of distance to the aforementioned optical axis position about a position at which the output light collimator 6 is set (or control information necessary for consolidating the aforementioned relative positional relationship at the driving unit 12). The driving unit 12 sets the position of the output light collimator 6 by driving the positioning stage 11 according to the contents of the control signal received from the aforementioned CPU 13.

Therefore, the aforementioned positioning stage 11 and the driving unit 12 are one example of a positioning unit which positions the relative positional relationship between the optical axis position and the output light collimator 6 in the case where the light from the input light collimator 4 is output toward the output light collimator 6 through reflection on each of the incident side planes 5c of the reflective etalons 5-1 and 5-2. Furthermore, the CPU 13 and the memory 14 are one example of a positioning control unit which controls the driving unit 12 so that the aforementioned relative positional relationship becomes an optimal positional relationship set in association with the group delay characteristics.

Besides, the memory 14 is one example of a memory unit which stores positioning control information which is for positioning at the positioning stage 11 and the driving unit 12 serving as the positioning unit in association with the group delay characteristics at the reflective etalons 5-1 and 5-2. Furthermore, the CPU 13 is one example of a control designation unit which performs control designation to the driving unit 12 serving as the positioning unit by referring to the contents of the memory 14 in association with the group delay characteristics (the amount of dispersion compensation) controlled by the reflective etalons 5-1 and 5-2 serving as the group delay characteristic control unit.

The reflective etalons 5-1 and 5-2 of the variable dispersion compensator 10 in the first embodiment assign the group delay characteristics for dispersion compensation by reflection to the light introduced from the input light collimator 4 and lead the light to the output light collimator 6. At this time, the group delay characteristic which is assigned by cooperative operation of the reflective etalons 5-1 and 5-2 is controlled (tuned) according to the amount of target dispersion compensation. More specifically, the group delay characteristics are controlled by variably controlling resonator length of any one or both of the reflective etalons 5-1 and 5-2.

Furthermore, the relative positional relationship between the optical axis position and the arrangement position of the output light collimator 6 in the case where the light from the input light collimator 4 is output to toward the output light collimator 6 through reflection on the incident side plane (reflective film 5c) of the etalons 5-1 and 5-2 is position-controlled in association with the group delay characteristics. More specifically, the aforementioned positioning control is performed by setting the arrangement position of the output light collimator 6 through driving of the positioning stage 11. This can suppress deterioration in loss characteristics due to tuning of the dispersion compensation characteristics as illustrated below.

Figure 7A:
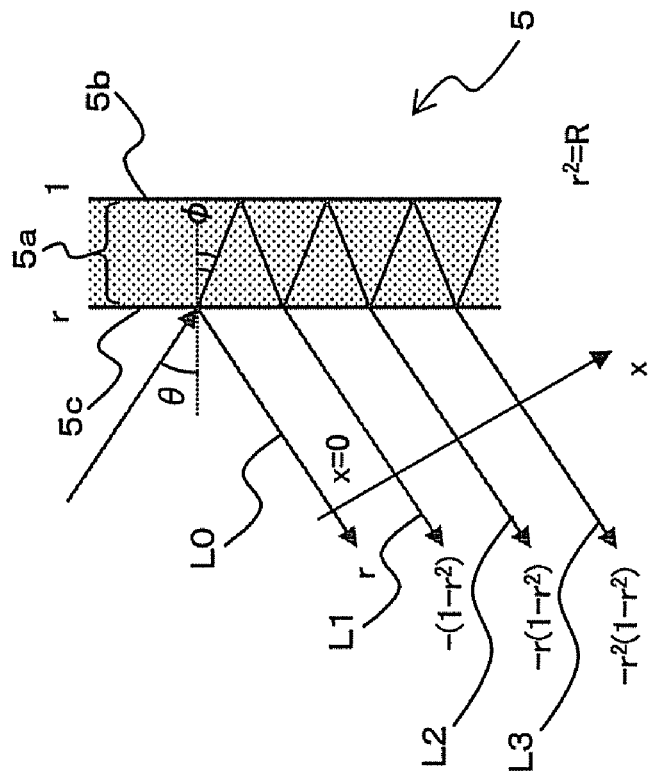
FIGS. 7A and 7B are both diagrams for explaining about the function of the variable dispersion compensator of the first embodiment.

[A3] Generation of Deterioration in Loss Characteristics Due to Tuning of Dispersion Compensation Characteristics Generation of deterioration in loss characteristics to be suppressed due to tuning of dispersion compensation characteristics will be described. First, light loss in an optical system composed of the input light collimator 4, the output collimator 6, and the reflective etalons 5-1 and 5-2 will be considered. In this case, for simplicity, the reflection on one reflective etalon 5 as illustrated in FIG. 7A is focused on and considered. That is, in this case, an optical system in which the light from the input light collimator 4 is reflected on the reflective etalon 5, and then led to the output light collimator 6 is assumed. Exemplarily, the reflective etalon 5 is one which is formed with the whole reflective film 5b on the backside of the etalon substrate 5a having a refractive index n and a thickness L and the partial reflective film 5c having an amplitude reflectance r (intensity reflectance: $R=r^2$) on the surface thereof.

Assume a case that light having a wavelength $\lambda$ (amplitude is set to 1) is made incident on the reflective etalon 5 (from the input light collimator 4 not illustrated in the drawing) at an incident angle $\theta$ (refraction angle $\phi$). At this time, an amplitude value of an optical component L0 reflected on the etalon surface (surface of the partial reflective film 5c) is r. Furthermore, an amplitude value of an optical component L1 to be emitted after reciprocating one time within a cavity is $-(1-r^2)$, an amplitude value of an optical component L2 to be emitted after reciprocating twice within the same is $-r(1-r^2)$, and an amplitude value of an optical component L3 to be emitted after reciprocating three times within the same is $-r^2(1-r^2)$. As described above, the optical component is attenuated r times each time the number of reciprocations within the cavity is increased by one.

Furthermore, a phase of a component of each light Li (i: integer of 0 or larger) differs $\Delta$ ($\approx 4\pi L \cos \phi/\lambda$) times, and a path differs ($2L \tan \phi \cos \theta$) times in an x axis direction illustrated in FIG. 7A. The x axis is such that the beam center position in the case where reflectance of the partial reflective film $5c$ of the etalon is 100% within the light incident plane and on a straight line perpendicular to the reflected light from the etalon 5 is set to zero (the original point), and a direction away from the input light collimator 4 is set as plus. Loss in the optical system in this case is obtained by superimposing coupling efficiency with the output light collimator 6 for all the optical components.

Figure 7B:
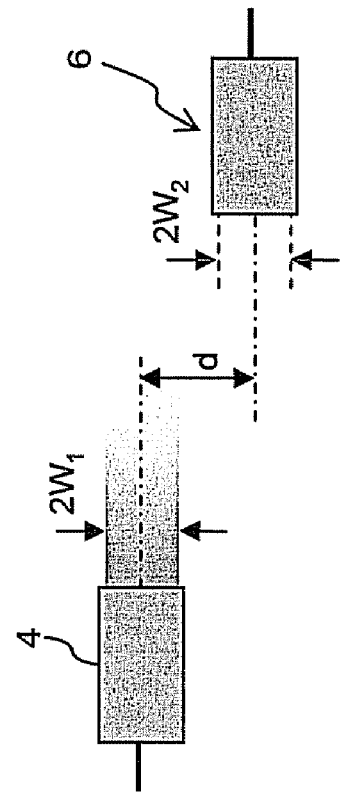

Assume an optical system which is composed of the input light collimator 4 and the output light collimator 6 as illustrated in FIG. 7B, and in which beam radii of the input light collimator 4 and the output light collimator 6 are W1 and W2, respectively, and distance between optical axes is d. In the case where spread of a beam and an inclination deviation of a collimator optical axis are negligible, a coupling efficiency $\eta$ of the input collimator 4 and the output collimator 6 in such optical system can be generally expressed by using these W1, W2, and d as illustrated in the following Equation 1.

Therefore, optical amplitude to be coupled to the output light collimator 6 in the case where the position of the output light collimator 6 is $x_c$ in FIG. 7A can be expressed by Equation 2 by taking together the above relationship. Then, intensity of this coupling light can be expressed as Equation 3 by using amplitude A of Equation 2. Since a relationship between light group velocity and phase velocity can be expressed by Equation 4, the group delay characteristic in an etalon optical system can be calculated from the wavelength dependence of amplitude A of Equation 2.

$$\eta(d) = \left(\frac{2W_1 W_2}{W_1^2 + W_2^2}\right)^2 \exp\left[-\frac{2d^2}{W_1^2 + W_2^2}\right] \quad \text{Equation 1}$$

$$A = r\sqrt{\eta(x_c)} - \sum_{m=1}^{\infty} r^{m-1}(1-r^2) \cdot e^{jm\Delta} \cdot \sqrt{\eta(x_c - 2mL\tan\phi\cos\theta)} \quad \text{Equation 2}$$

$$\text{Intensity} = |A|^2 \quad \text{Equation 3}$$

$$v_g = \frac{d\omega}{d\lambda} \quad \text{Equation 4}$$

It can be known that the transmitted light intensity in the optical system (that is, insertion loss of the optical system) in which the light from the input light collimator 4 is reflected on one reflective etalon 5, and then led to the output light collimator 6 is changed depending on resonator length of the etalon 5 (that is, phase difference $\Delta$ in Equation 2).

In the aforementioned description, for simplicity, the optical system in which only one etalon is used and the light is reflected only one time is considered; however, as the variable dispersion compensator 10 in the first embodiment (see FIG. 6), almost the same discussion as above holds for the case where a plurality of the etalons 5-1 and 5-2 are combined and used and also in the case of a multistage configuration in which the light transmits through the same etalon more than once by a loopback configuration. That is, an equation corresponding to the above mentioned Equation 2 becomes complicated; however, it is the same in that the loss characteristics of the optical system change depending on change in resonator length of the etalon.

[A4] Technique for Suppressing Deterioration in Loss Characteristics

The variable dispersion compensator 10 in the first embodiment can suppress insertion loss (coupling loss) in the optical system which fluctuates depending on the resonator length as aforementioned through positioning control of the output light collimator 6.

That is, as illustrated in FIG. 6, the position $x_c$ of the output light collimator 6 is position-controlled through the control on the driving unit 12 by the CPU 13 and the memory 14 serving as the positioning control unit. More specifically, the position $x_c$ of the output light collimator 6 is position-controlled so that an amplitude value obtained from a derived equation conforming to Equation 2 (or Equation 3) becomes the maximum (or so that fluctuation amplitude, that is, ripple becomes the minimum) each time the resonator length of the etalon is changed for tuning the dispersion compensation characteristics.

As described above, the memory 14 stores information (for example, information of the amount of control on the driving unit 12 corresponding to an $x_c$ value) on the $x_c$ value of the optimum position of the output light collimator 6 corresponding to the resonator length of the etalons 5-1 and 5-2, the $x_c$ value being obtained from the derived equation conforming to the aforementioned Equation 2 (or Equation 3). This allows the CPU 13 to obtain the amount of control on the driving unit 12 for positioning of the output light collimator 6 at the optimum position in association with the amount of control about the resonator length to the etalons 5-1 and 5-2. Therefore, deterioration in optical insertion loss due to a change in the dispersion compensation characteristics (the amount of compensation) can be minimized through the control of the CPU 13 on the driving unit 12.

Figure 8:
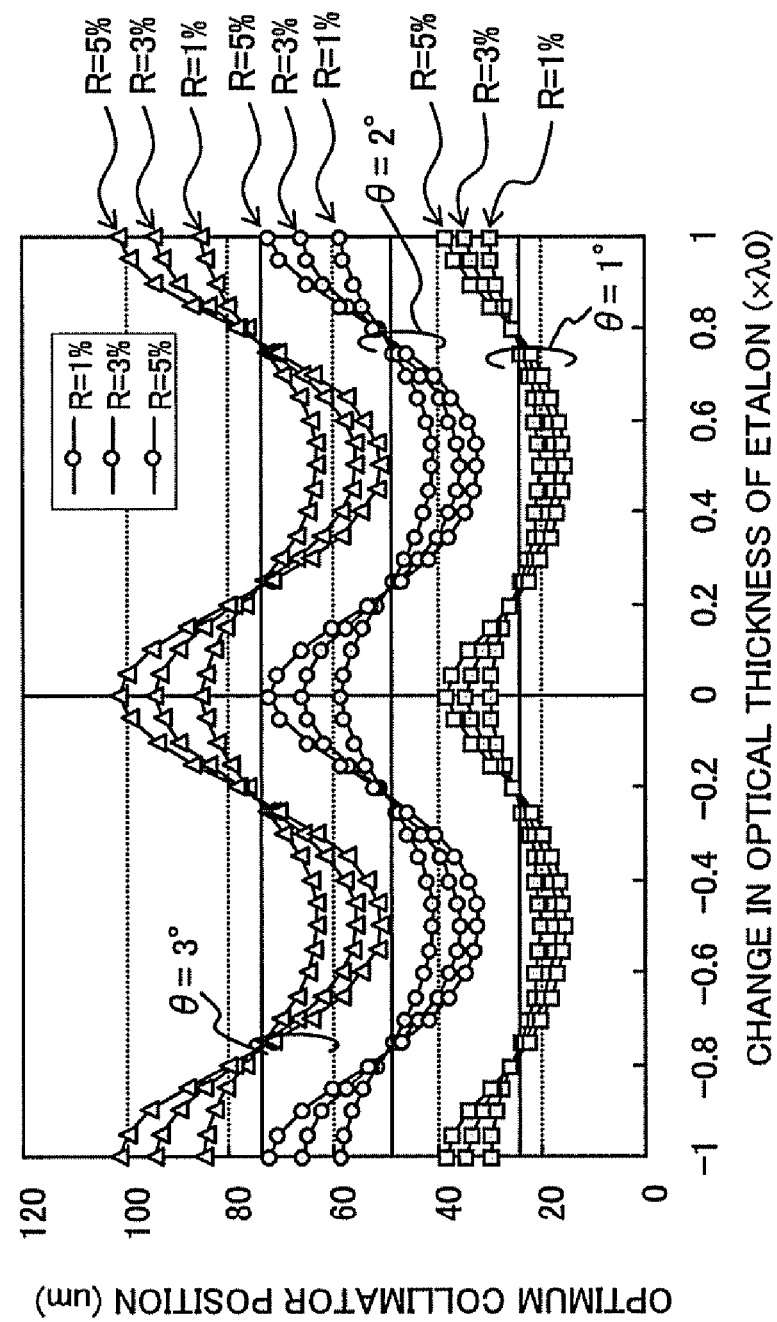
FIG. 8 is a diagram for explaining about the function of the variable dispersion compensator of the first embodiment.

As one example, FIG. 8 is a diagram illustrating a relationship of the optimum position (position where loss in grid wavelength becomes the minimum) of the output light collimator 6 corresponding to the resonator length of the reflective etalon 5 by assuming a one time reflective optical system which uses the reflective etalon 5 illustrated in the aforementioned FIG. 7A. That is, FIG. 8 illustrates appropriate positions $x_c$ (longitudinal axis) of the output light collimator 6, which are to be led out according to the resonator length (lateral axis) in variations when the light incident angle $\theta$ is set to 1°, 2°, and 3°, and the reflectance R of the input and output planes of the partial reflective films $5c$ is set to 1%, 3%, and 5%.

Exemplarily, both beam radii $W_1$ and $W_2$ of the collimators 4 and 6 are set to 100 µm, and the FSR of the etalon 5 in any case is set to 100 GHz. Furthermore, the resonator length corresponding to the lateral axis is illustrated as a ratio to wavelength for a change in optical thickness of the etalon 5.

As is apparent from FIG. 8, when optical thickness of the etalon 5 is changed, the optimum position (position where loss in wavelength grid becomes the minimum) of the output light collimator 6 is substantially periodically changed. Furthermore, FIG. 8 illustrates that the optimum position fluctuates centered on a beam reach position ($x_c$=2L tan $\phi$ cos $\theta$) in the case where reflectance of the input and output planes of the etalons 5 is assumed to be 0%. In addition, the larger the reflectance of the input and output planes is, the lager the amplitude of the fluctuation is, and the larger the light incident angle is, the larger the amplitude of the fluctuation is. As for incident angle dependence, more strictly, when 2L tan $\phi$ cos $\theta$ coincides with the beam radius, fluctuation of the optimum collimator position becomes the maximum.

Then, in the aforementioned comparative example, the incident angle is required to be small as much as possible in order to improve the loss characteristics; however, even if the incident angle is set larger to some extent, the loss characteristics can be improved through adjustment of the arrangement position of the output light collimator 6 as in the first embodiment. This eliminates necessity of widening the interval between the etalons 5-1 and 5-2 in order to avoid beam eclipse due to the edges of the etalons 5-1 and 5-2; therefore, miniaturization of scale as the whole device can be expected.

In the exemplifications in this case, for simplicity of description, the optical system of one time reflection using one etalon 5 is adopted as a consideration model; however, the same discussion as above holds for the case of the positioning control of the output light collimator 6 in the variable dispersion compensator 10 in the first embodiment. Furthermore, the same applies to the case of the multistage configuration in which light transmits through the same etalon more than once by the loopback configuration.

Also in this case (using plural etalons), the same behavior can be observed in that the optimum position of the collimator 6 changes almost periodically with a change in the resonator length of the etalons 5-1 and 5-2, the amount of variation of the optimum collimator position increases depending on the incident angle, reflectance of the film, and the like. Furthermore, a plurality of the etalons 5-1 and 5-2 are used and the loopback multistage configuration is adopted, and accordingly the amount of variation of the optimum position is increased by the number of times (stages) of transmitting through the etalon. That is, fluctuation in loss is also large.

That is, in the case of the optical system which uses a plurality of etalons 5-1 and 5-2 and the optical system of the multistage configuration in which light transmits through the same etalon more than once by the loopback configuration, it becomes possible to increase suppression effect of light loss through the aforementioned positioning control.

[A5] Suppression Effect of Deterioration in Loss Characteristics

Next, loss generated due to tuning of the dispersion compensation characteristics will be compared about the case where the position of the output light collimator 6 is fixed (see FIG. 2) and the case where positioning of the output light collimator 6 is performed as in the variable dispersion compensator 10 of the first embodiment.

First, the description will be made about the case where the output light collimator 6 is fixed without performing positioning control.

As an example, about the variable dispersion compensator 3 illustrated in the aforementioned FIG. 2, light loss which is generated in the case where inclination of synthesized group delay characteristics is controlled by fixing the group delay peak of the low finesse etalon to the wavelength grid and by changing the resonator length of the high finesse etalon 5-2 (R=7%) is considered. In this case, the position of the output light collimator 6 is fixed so that the loss in the wavelength grid becomes the minimum when the amount of dispersion compensation is 0 ps/nm (in the case where the bottom of the group delay characteristics of the high finesse etalon 5-2 coincides with the wavelength grid).

Figure 9:
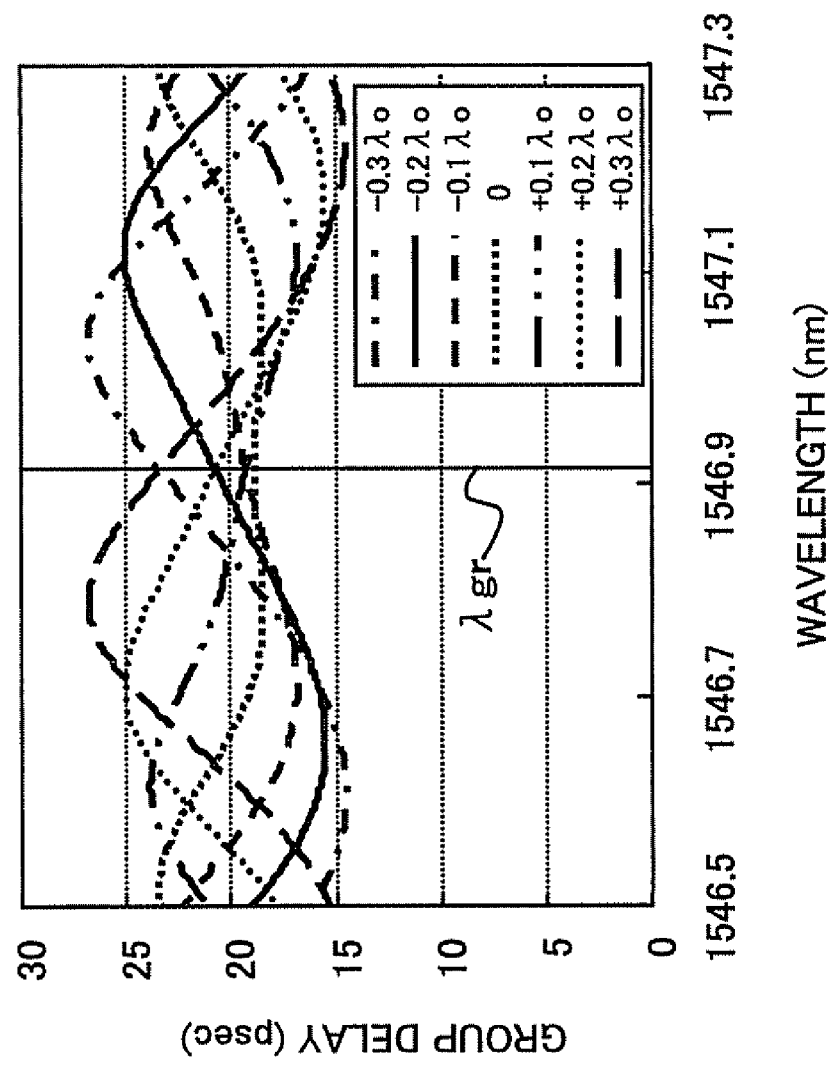
FIG. 9 is a diagram illustrating a change in group delay characteristics in the case where dispersion compensation characteristics are changed by controlling resonator length of a high finesse etalon with a position of an output light collimator being fixed.
Figure 10:
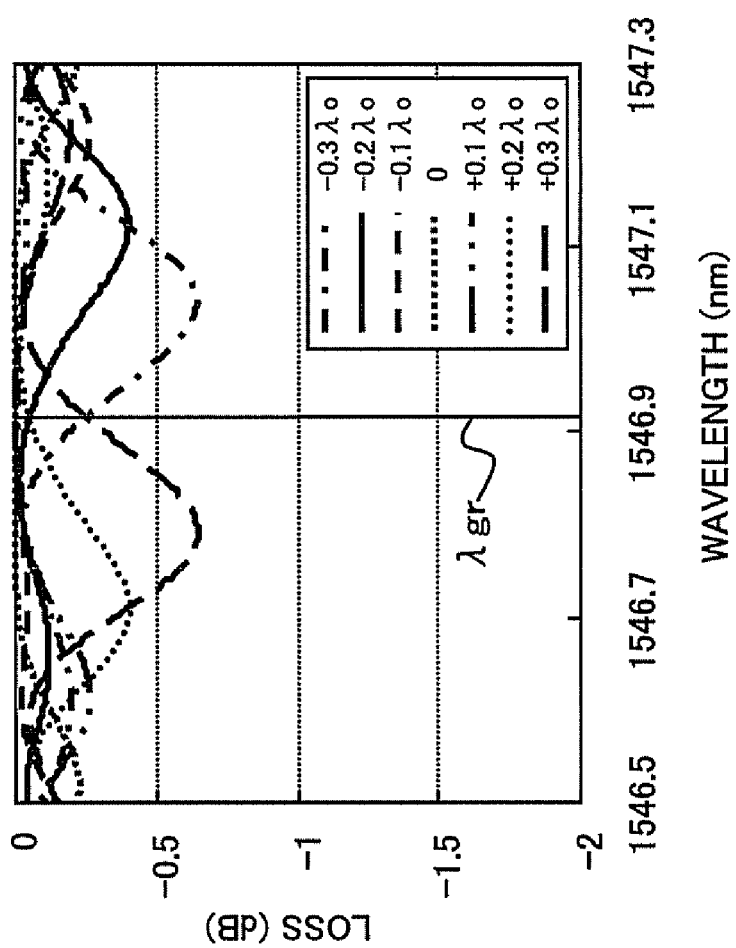
FIG. 10 is a diagram illustrating a change in loss spectrum in the case where the dispersion compensation characteristics are changed by controlling the resonator length of the high finesse etalon with the position of the output light collimator being fixed.

FIG. 9 is a diagram illustrating a change in group delay characteristics in the case where the dispersion compensation characteristics are changed by controlling the resonator length of the high finesse etalon 5-2 with the position of the output light collimator 6 being fixed at the concerned position, and FIG. 10 is a diagram illustrating a change in loss spectrum at that time. As illustrated in FIG. 10, focusing attention on a grid wavelength $\lambda$gr, it can be recognized that optical coupling loss (dB) is fluctuaded to no small extent with a change in the resonator length ($-0.3 \times \lambda_0$ to $+0.3 \times \lambda_0$).

Figure 11:
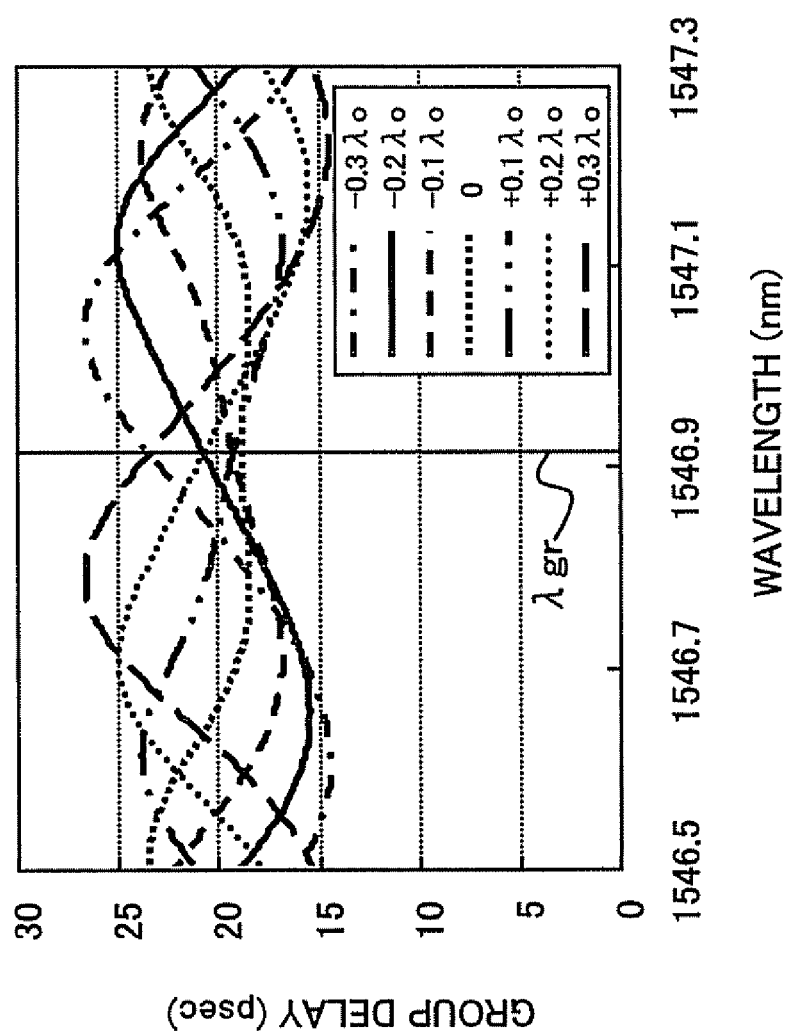
FIG. 11 is a diagram illustrating a change in group delay characteristics of output light in the case where a position of the output light collimator is adjusted by positioning control each time the amount of dispersion compensation is changed.
Figure 12:
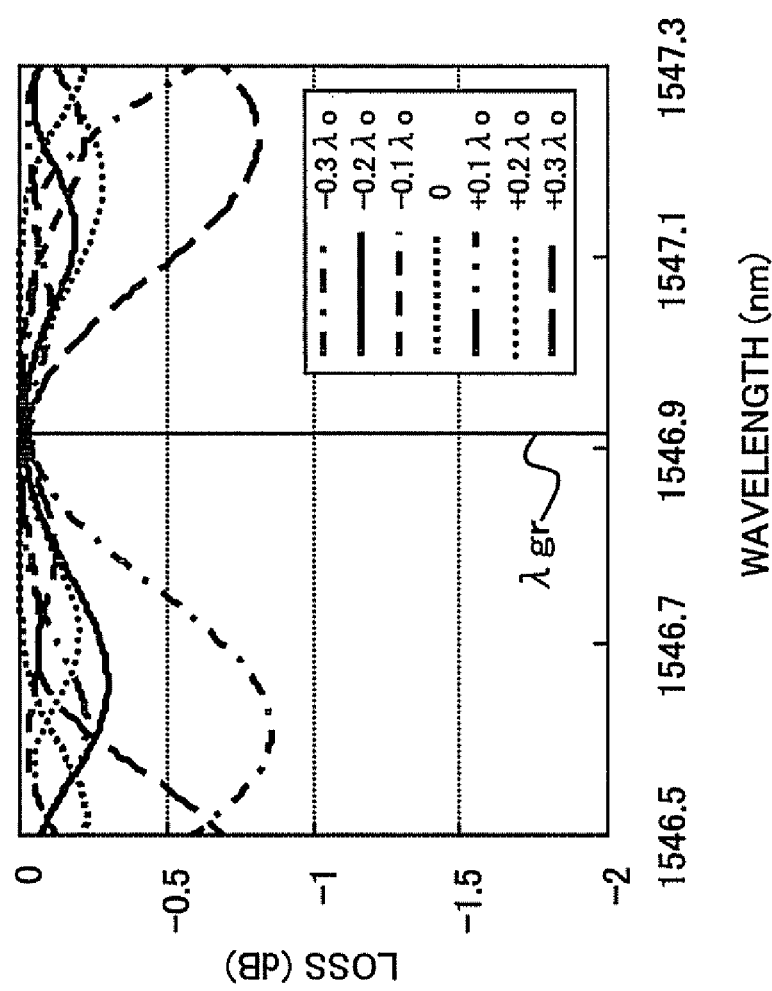
FIG. 12 is a diagram illustrating a change in loss spectrum in the case where the position of the output light collimator is adjusted by positioning control each time the amount of dispersion compensation is changed.

Next, about the variable dispersion compensator 10 in the first embodiment illustrated in FIG. 6, the coupling loss which is generated in the case where the position of the output light collimator 6 (position of etalon, or beam position) is adjusted every time so that a loss value in wavelength grid becomes the minimum each time the amount of dispersion compensation is changed is considered. FIG. 11 is a diagram illustrating a change in group delay characteristics of output light in the case where the position of the output light collimator 6 is adjusted by positioning control each time the amount of dispersion compensation is changed, and FIG. 12 is a diagram illustrating a change in loss spectrum at that time. In the diagram illustrated in FIG. 12, focusing attention on the grid wavelength $\lambda$gr, it can be recognized that loss fluctuation is suppressed effectively.

Therefore, as illustrated in FIG. 10, in the conventional variable dispersion compensator 3 which fixes optical parts such as the output light collimator 6 and the etalons 5, fluctuation in insertion loss due to the tuning of the amount of dispersion compensation is generated to no small extent.

Figure 13:
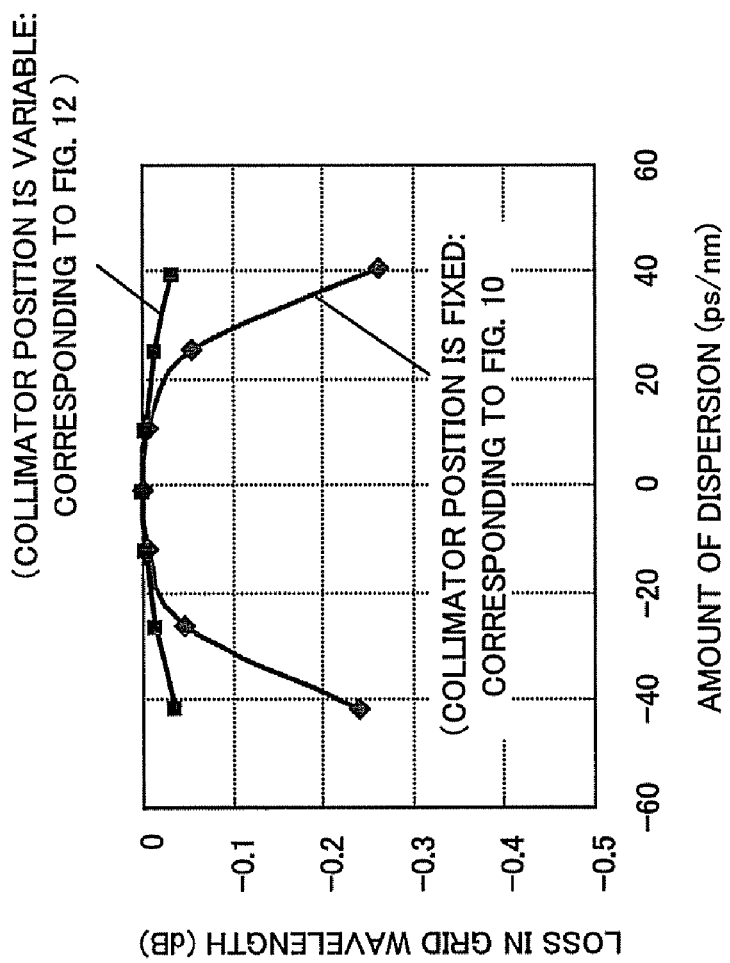
FIG. 13 is a diagram in which results obtained in FIGS. 10 and 12 are reorganized in terms of the amount of dispersion compensation and a loss value in wavelength grid.

On the other hand, in the variable dispersion compensator 10 in the first embodiment, as illustrated in FIG. 12, it becomes possible to minimize deterioration in loss characteristics. FIG. 13 is a diagram in which results obtained in FIGS. 1b and 12 are summarized in terms of the amount of dispersion compensation and the loss value in wavelength grid. In the case of this example, it can be recognized that the value of the optical coupling loss can be suppressed to ⅛ at a maximum.

As described above, according to the first embodiment, there is an advantage that deterioration in loss characteristics can be minimized in the case of changing the amount of dispersion compensation.

Furthermore, there is an advantage that scale of the whole device can be miniaturized.

Figure 14:
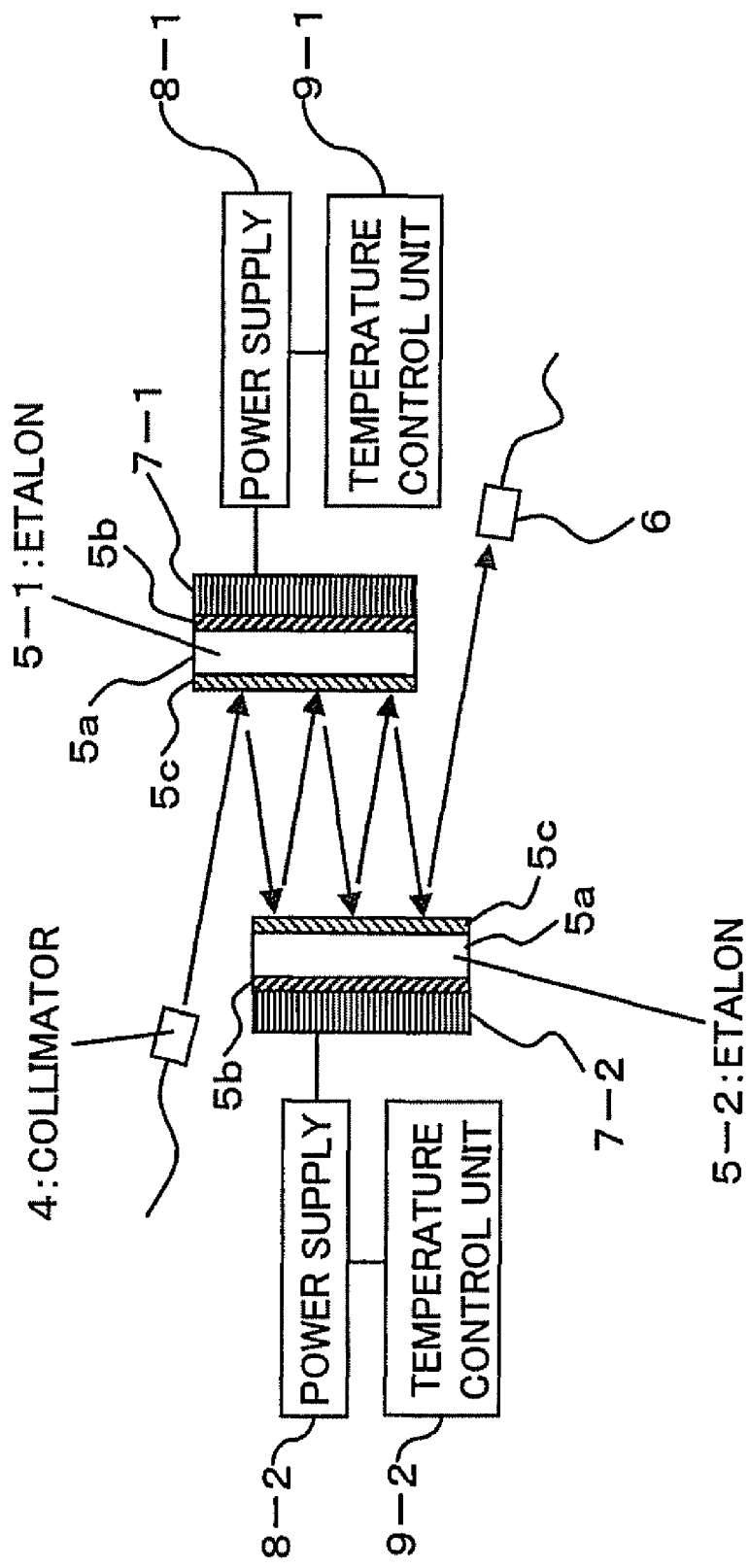
FIG. 14 is a diagram for explaining a modification of the first embodiment.

One stage configuration where light is transmitted through the etalons 5-1 and 5-2 one time, respectively, is considered in the aforementioned description; however, reduction effect of light loss fluctuation can be similarly described for various modifications. For example, as illustrated in FIG. 14, reduction effect of loss can be similarly described even in the case where an optical system in which light reciprocates several times between a plurality of etalons 5-1 and 5-2 arranged in face-to-face relation is adopted.

In such an optical system, it is easy to expand the amount of dispersion compensation as compared with one stage configuration. In the case where the optical system is configured in multistage as described above, deterioration in loss characteristics due to the tuning of characteristics (or deterioration in loss ripple characteristics) mentioned until now is increased by the number of stages configured in multistage. Therefore, in such a variable dispersion compensator configured in multistage, it becomes possible to further increase the reduction effect of optical insertion loss through the aforementioned positioning control.

In the first embodiment, positioning is performed by movement adjustment of the output light collimator 6 in the positioning stage 11; however, positioning may be performed by movement adjustment for the input light collimator 4. Even in this way, it is possible to suppress loss fluctuation. The reason is that the relative positional relationship between the optical axis and the output light collimator 6 can be controlled by moving the input light collimator 4 in association with the group delay characteristics to be controlled.

[B] Second Embodiment

Figure 15:
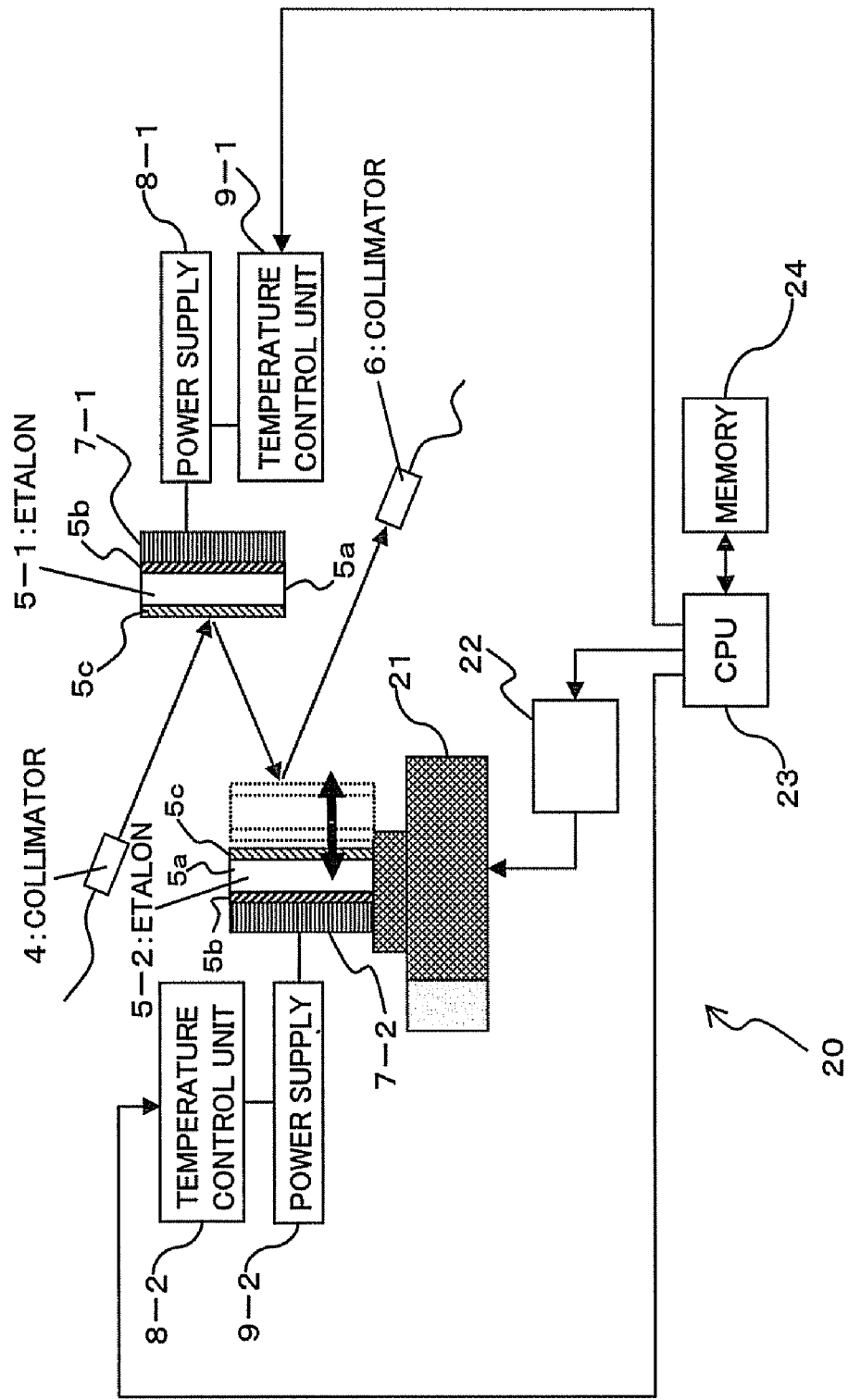
FIG. 15 is a diagram illustrating a variable dispersion compensator of a second embodiment.

FIG. 15 is diagram illustrating a variable dispersion compensator 20 according to a second embodiment. In the variable dispersion compensator 20 illustrated in FIG. 15, a mode of the positioning control is different form that of the variable dispersion compensator 10 in the aforementioned first embodiment. More specifically, an arrangement position of at least one (in this case, reflective etalon 5-2) of two reflective etalons 5-1 and 5-2 is controlled by movement adjustment in association with the amount of dispersion compensation. In FIG. 15, the same reference numerals as those illustrated in FIG. 6 show substantially similar elements.

Furthermore, different from the case of the aforementioned first embodiment, for example, an output light collimator 6 is fixed at the position where the optical coupling loss become minimum when distance between the reflective etalons 5-1 and 5-2 is set to a certain reference value. The position of the etalon 5-2 at this time is set as a reference position.

Then, the distance between the reflective etalons 5-1 and 5-2 is adjusted by moving the reflective etalon 5-2, and accordingly a relative positional relationship between an optical axis of an output light beam obtained by reflection on the incident plane sides of the respective etalons 5-1 and 5-2 and an optical axis of the output light collimator 6 is adjusted. The coupling loss of the collimator 6 can be suppressed through the adjustment of the arrangement position of the reflective etalon 5-2.

Therefore, in the second embodiment, a positioning stage 21 which moves the arrangement position of the reflective etalon 5-2 while maintaining reflection planes in parallel is provided, in place of the positioning stage 11 illustrated in FIG. 6. Furthermore, a driving unit 22 drives the positioning stage 21 by receiving control from CPU 23.

The CPU 23 controls temperature control units 9-1 and 9-2 in order to set the amount of dispersion compensation according to a command and controls the driving unit 22 by referring to a memory 24 in association with the amount of dispersion compensation, as in the first embodiment. In the case of adopting a system which moves the reflective etalon 5-2, a relationship with the amount of movement x of an output beam with respect to a change in distance (D) between the etalons 5-1 and 5-2 is expressed by the following Equation 5. In this regard, however, the number of stages configured in multistage by loopback is expressed by N.

$$\frac{dx}{dD} = -\frac{\sin 2\theta}{\cos \theta} N \qquad \text{Equation 5}$$

That is, the memory 24 stores an output light beam position x which can optimally suppress coupling loss in association with a set value of the amount of dispersion compensation. Furthermore, in association with Equation 5, as control parameters which are for achieving the output light beam position x, information of the amount of movement with respect to the aforementioned reference position of the etalon 5-2 serving as control parameters to the driving unit 22 is stored. In the present embodiment, the etalon 5-1 is fixedly arranged; therefore, the amount of movement with respect to the reference position of the etalon 5-2 can be associated with the distance between etalons D obtained by Equation 5.

The output light beam position x can be recognized as a relative positional relationship of the optical axis of the output light beam corresponding to the distance D between the etalons, which are set by the movement of the etalon 5-2 with respect to the optical axis of the output light collimator 6 which is fixedly arranged as described above. That is, the CPU 23 refers to the memory 24 and controls the driving unit 22, and accordingly the reflective etalon 5-2 can be positioned in association with the amount of movement of an output light beam x. In other words, the distance between the reflective etalons 5-1 and 5-2 can be set to a distance which achieves the amount of movement of the output light beam x in which light loss is a predetermined amount (optimally controlled amount) in association with the amount of dispersion compensation (group delay characteristics).

Furthermore, usually, an incident angle θ from the input light collimator 4 is a value of approximately several degrees at the most; therefore, the right side of Equation 5 becomes a value smaller than 1 (though depending on the size of N). A change in distance between the optical axes with respect to movement distance in the case where the distance between the etalons 5-1 and 5-2 is varied as illustrated in FIG. 15 is smaller than that in the case where the position of the collimator 6 is varied as illustrated in FIG. 6. That is, the variable dispersion compensator 20 of the second embodiment is larger in positioning tolerance than the variable dispersion compensator 10 of the first embodiment, and loss control with higher accuracy can be performed.

Therefore, the aforementioned a positioning stage 21 and the driving unit 22 are one example of a positioning unit which positions the relative positional relationship between the optical axis position and the output light collimator 6 in the case where the light from the input light collimator 4 is output toward the output light collimator 6 through reflection on each of the incident side planes 5c of the reflective etalons 5-1 and 5-2. Furthermore, the CPU 23 and the memory 24 are one example of a positioning control unit which controls the driving unit 12 so that the aforementioned relative positional relationship becomes a positional relationship set in association with group delay characteristics (the amount of dispersion compensation) controlled by the CPU 23.

In this case, the positioning stage 21 and the driving unit 22 serving as the positioning unit performs the aforementioned positioning by movement adjustment of the reflective etalons 5-1 and 5-2 serving as a group delay characteristic assignment unit. In the present embodiment, the positioning is performed by the movement adjustment of one reflective etalon 5-2; however, the positioning may be performed by movement adjustment of other reflective etalon 5-1, or the positioning may be performed by movement adjustment of both etalons 5-1 and 5-2.

In addition, the memory 24 is one example of a memory unit which stores control information which is for positioning in the positioning stage 21 and the driving unit 22 serving as the positioning unit in association with the group delay characteristics in the reflective etalons 5-1 and 5-2. Furthermore, the CPU 23 is one example of a control designation unit which performs control designation to the driving unit 22 serving as the positioning unit by referring to the contents of the memory 24 according to the group delay characteristics (the amount of dispersion compensation) controlled by the reflective etalons 5-1 and 5-2 serving as a group delay characteristic control unit.

As described above, according to the second embodiment, there is an advantage that loss deterioration is minimized while minimizing device scale in the case of changing the amount of dispersion compensation as in the aforementioned first embodiment, and in addition to the advantage, there is also an advantage that control for suppressing deterioration in loss can be performed with further high accuracy as compared with the case of the first embodiment.

[C] Third Embodiment

FIGS. 16A and 16B are both diagrams illustrating a variable dispersion compensator 30 according to a third embodiment, FIG. 16A is its typical top view, and FIG. 16B is its typical front view. In the variable dispersion compensator 30 illustrated in FIGS. 16A and 16B, a mode of control which corresponds to the positioning control in the case of the variable dispersion compensators 10 and 20 in the aforementioned first and the second embodiments is different. More specifically, an optical axis position of output light beam to be coupled to the output light collimator 6 according to the amount of dispersion compensation is controlled by a beam position control plate 31. In FIGS. 16A and 16B, the same reference numerals as those illustrated in FIG. 6 show substantially similar elements.

In this case, in the variable dispersion compensator 30 according to the third embodiment, an input light collimator 4, reflective etalons 5-1 and 5-2, an output light collimator 6, a beam position control plate 31, and an angle adjustment mechanism 32a which adjusts an angle of the beam position control plate 31 are arranged and fixed in a housing 39. In the variable dispersion compensator 30 of the third embodiment, light made incident from the input light collimator 4 reciprocates four times by reflection between the reflective etalons 5-1 and 5-2, and then the light is led to the output light collimator 6 through the beam position control plate 31.

Furthermore, the variable dispersion compensator 30 is provided with a driving unit 32b which drives an angle adjustment mechanism 32a, a CPU 33, and a memory 34. Power supplies 8-1 and 8-2, temperature control units 9-1 and 9-2, the driving unit 32b, the CPU 33, and the memory 34 are not illustrated in FIG. 16B.

The beam position control plate 31 is made of, for example, a transparent plate which transmits the light emitted through reflection on the etalons 5-1 and 5-2, and can directly shift an optical axis position of an output light beam from the etalon 5-2 by controlling an angle thereof. Furthermore, the angle adjustment mechanism 32a receives driving control from the driving unit 32b and movably adjusts the angle of the beam position control plate 31 by motor power, power to which a piezo element is applied, or the like.

Furthermore, the CPU 33 controls temperature adjustment at the temperature control units 9-1 and 9-2 in association with the amount of dispersion compensation set by commands or the like and assigns the amount of control to the driving unit 32b according to the amount of dispersion compensation by referring to the memory 34.

That is, the memory 34 stores an output light beam position x which can optimally suppress insetrion loss in association with a setting value of the amount of dispersion compensation on the basis of an equation conforming to the aforementioned Equation 2 (equation which derives coupling efficiency corresponding to an optical axis position x of the output light beam complied with an optical system in which two etalons 5-1 and 5-2 reflect four times, respectively). Furthermore, angle information serving as control parameters to the driving unit 32b is stored as control parameters which are for achieving the output light beam position x.

With this method, the CPU 33 refers to the memory 34 and controls the driving unit 32a, and accordingly the angle of the beam position control plate 31 is set so that the amount of movement of the output light beam x which optimizes the light loss is obtained.

Therefore, the aforementioned beam position control plate 31, the angle adjustment mechanism 32a, and the driving unit 32b are one example of a positioning unit which positions a relative positional relationship between the optical axis position and the output light collimator 6 in the case where the light from the input light collimator 4 is output toward the output light collimator 6 through reflection on each of incident side planes 5c of the reflective etalons 5-1 and 5-2. Furthermore, the CPU 33 and the memory 34 are one example of a positioning control unit which controls the driving unit 32b so that the aforementioned relative positional relationship becomes a positional relationship set in association with group delay characteristics (the amount of dispersion compensation) controlled by the CPU 33.

In this case, the beam position control plate 31, the angle adjustment mechanism 32a, and the driving unit 32b, serving as the positioning unit perform the aforementioned positioning by movement adjustment of the optical axis position of the light led to the output light collimator 6.

In addition, the memory 34 is one example of a memory unit which stores control information which is for positioning at the beam position control plate 31, the angle adjustment mechanism 32a, and the driving unit 32b, serving as the positioning unit in association with the group delay characteristics in the reflective etalons 5-1 and 5-2. Furthermore, the CPU 33 is one example of a control designation unit which performs control designation to the driving unit 32b serving as the positioning unit by referring to the contents of the memory 34 in association with the group delay characteristics (the amount of dispersion compensation) controlled by the reflective etalons 5-1 and 5-2 serving as a group delay characteristic control unit.

As described above, also in the third embodiment, loss deterioration can be minimized in the case where the amount of dispersion compensation is varied while miniaturizing device scale, as in the aforementioned first embodiment.

[D] Fourth Embodiment

FIGS. 17A and 17B are diagrams illustrating a variable dispersion compensator 40 according to a fourth embodiment, FIG. 17A is its typical top view, and FIG. 17B is its typical front view. In the variable dispersion compensator 40 illustrated in FIGS. 17A and 17B, a mode of control which corresponds to the arrangement of the optical system and the positioning control in the case of the variable dispersion compensators 10, 20, and 30 in the aforementioned first to the third embodiments is different. In FIGS. 17A and 17B, the same reference numerals as those illustrated in FIG. 6 show substantially similar elements.

In this case, in the variable dispersion compensator 40 according to the fourth embodiment, an input light collimator 44, reflective etalons 5-1 and 5-2, an output light collimator 46, a reflecting mirror 41, and an adjustment mechanism 42a which adjusts an arrangement position of the reflecting mirror 41 by, for example, motor power, power to which a piezo element is applied, or the like are arranged and fixed in a housing 49. Furthermore, a driving unit 42b which drives the adjustment mechanism 42a, a CPU 47, and a memory 48 are provided. Power supplies 8-1 and 8-2, temperature control units 9-1 and 9-2, the driving unit 42b, the CPU 47, and the memory 48 are not illustrated in FIG. 17B.

In the variable dispersion compensator 40 in the fourth embodiment, the input light collimator 44 and the output light collimator 46 are arranged side by side with each other and fixed in the housing 49. Then, after light output from the input light collimator 44 reciprocates four times between two reflective etalons 5-1 and 5-2, the light is reflected by the reflecting mirror 41 and reciprocates again four times between the reflective etalons 5-1 and 5-2, and then the light is led to the output light collimator 46.

Therefore, the reflecting mirror 41 is one example of a reflecting member which reflects light output from the reflective etalons 5-1 and 5-2 serving as a group delay characteristic assignment unit and forms a reciprocating optical path which goes through the reflective etalons 5-1 and 5-2 between the input light collimator 44 and the output light collimator 46.

The reflecting mirror 41 is made of, for example, a corner cube, a retroreflector, or the like, and movably adjusts a relative position of an optical axis of light reflected against the light incident from the etalon 5-2 through adjustment of the arrangement position at the adjustment mechanism 42a. The driving unit 42b receives control from the CPU 47 and drives the position adjustment mechanism 42a.

More specifically, the adjustment mechanism 42a movably adjusts the arrangement position or angle of the reflecting mirror 41 so that the optical axis of the reflected light is movably adjusted, for example, in a direction Ax1 illustrated in FIG. 17A while maintaining the reflected light parallel to the incident light. The optical axis of the reflected light at the reflecting mirror 41 is movably adjusted in the direction Ax1, and accordingly the optical axis of the light to be incident on the output light collimator 46 is movably adjusted in a direction Ax2 corresponding to the direction Ax1.

Furthermore, basically as in the case of the aforementioned respective embodiments, the CPU 47 refers to the memory 48, and accordingly temperature adjustment at the temperature control units 9-1 and 9-2 is controlled in association with the amount of dispersion compensation set by commands or the like, and the amount of control is assigned to the driving unit 42b in association with the amount of dispersion compensation.

That is, the memory 48 stores an output light beam position x which can optimally suppress light loss according to a setting value of the amount of dispersion compensation on the basis of an equation conforming to the aforementioned Equation 2 (equation which derives coupling efficiency corresponding to an optical axis position x of the output light beam complied with an optical system in which two etalons 5-1 and 5-2 reflect eight times, respectively). Furthermore, information of the amount of control to the adjustment mechanism 42a serving as control parameters to the driving unit 42b is stored as control parameters which are for achieving the output light beam position x.

With this method, the CPU 47 refers to the memory 48 and controls the driving unit 42a, and accordingly the arrangement of the reflecting mirror 41 is set so that the amount of movement of the output light beam x which optimizes the light loss is obtained.

Therefore, the aforementioned reflecting mirror 41, the adjustment mechanism 42a, and the driving unit 42b are one example of a positioning unit which positions a relative positional relationship between the optical axis position and the output light collimator 6 in the case where the light from the input light collimator 44 is output toward the output light collimator 46 through reflection on each of incident side planes 5c of the reflective etalons 5-1 and 5-2. Furthermore, the CPU 47 and the memory 48 are one example of a positioning control unit which controls the driving unit 42b so that the aforementioned relative positional relationship becomes a positional relationship set in association with group delay characteristics (the amount of dispersion compensation) controlled by the CPU 47.

In this case, the reflecting mirror 41, the adjustment mechanism 42a, and the driving unit 42b, serving as the positioning unit perform the positioning adjustment of the optical axis position Ax2 of the light led to the output light collimator 6 by moving the optical axis position Ax1 of the reflected light on the reflecting mirror 41.

In addition, the memory 48 is one example of a memory unit which stores control information which is for positioning at the reflecting mirror 41, the adjustment mechanism 42a, and the driving unit 42b, serving as the positioning unit in association with the group delay characteristics in the reflective etalons 5-1 and 5-2. Furthermore, the CPU 47 is one example of a control designation unit which performs control designation to the driving unit 42b serving as the positioning unit by referring to the contents of the memory 48 in association with the group delay characteristics (the amount of dispersion compensation) controlled by the reflective etalons 5-1 and 5-2 serving as a group delay characteristic control unit.

As described above, also in the fourth embodiment, loss deterioration can be minimized in the case where the amount of dispersion compensation is varied while miniaturizing device scale, as in the aforementioned first embodiment.

[E] Other

The aforementioned respective embodiments exemplify the cases where a plurality of reflective etalons 5-1 and 5-2 serving as a group delay characteristic assignment unit are provided. However, even in the case where one sheet of reflective etalon and a mirror facing the reflective etalon are provided, as described in the aforementioned A3, it is useful in that light loss can be reduced by positioning a relative positional relationship between an optical axis of an output light beam and an optical axis of an output light collimator 6 in association with the amount of dispersion compensation.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A variable dispersion compensator, comprising:
an input light collimator which introduces input light;
a group delay characteristic assignment unit in which a plurality of reflective etalons are arranged in face-to-face relation so as to form an optical path by reflection for light introduced from the input light collimator, and which assigns variable group delay characteristics to the light by reflection on the plurality of the reflective etalons;
an output light collimator which receives the light to which the variable group delay characteristics are assigned by the group delay characteristic assignment unit;
a group delay characteristic control unit which controls the group delay characteristics at the group delay characteristic assignment unit in order to perform dispersion compensation for an optical signal of the light introduced from the input light collimator;
a positioning unit which positions a relative positional relationship between an optical axis position and the output light collimator in the case where the light from the input light collimator is led to the output light collimator through reflection on each of incident side planes of the plurality of the reflective etalons; and
a positioning control unit which controls the positioning unit so that the relative positional relationship becomes a positional relationship set in association with the group delay characteristics controlled by the group delay characteristic control unit.

2. The variable dispersion compensator according to claim 1, wherein the positioning unit performs the positioning by movement adjustment of a position where the input light collimator or the output light collimator is arranged.

3. The variable dispersion compensator according to claim 1, wherein the positioning unit performs the positioning by movement adjustment of an arrangement position of the group delay characteristic assignment unit.

4. The variable dispersion compensator according to claim 1, wherein the positioning unit performs the positioning by movement adjustment of the optical axis position of the light to be led to the output light collimator.

5. The variable dispersion compensator according to claim 1,
wherein the positioning control unit comprises:
a memory unit which stores control information which is for positioning at the positioning unit in association with the group delay characteristics in the group delay characteristic assignment unit; and
a control designation unit which performs control designation to the positioning unit by referring to the contents of the memory unit in association with the group delay characteristics controlled by the group delay characteristic control unit.

6. The variable dispersion compensator according to claim 2, wherein the positioning unit includes a mechanical positioning mechanism.

7. The variable dispersion compensator according to claim 3, wherein the positioning unit includes a mechanical positioning mechanism.

8. The variable dispersion compensator according to claim 4, wherein the positioning unit includes a mechanical positioning mechanism.

9. The variable dispersion compensator according to claim 2, wherein the positioning unit includes a piezo element.

10. The variable dispersion compensator according to claim 3, wherein the positioning unit includes a piezo element.

11. The variable dispersion compensator according to claim 4, wherein the positioning unit includes a piezo element.

12. The variable dispersion compensator according to claim 4,
wherein the positioning unit comprises:
a transparent plate which transmits the light from the group delay characteristic assignment unit; and
an angle adjustment mechanism which movably adjusts an angle of the transparent plate.

13. The variable dispersion compensator according to claim 4,
wherein the positioning unit includes:
a reflecting member which reflects the light output from the group delay characteristic assignment unit and forms a reciprocating optical path which goes through the group delay characteristic assignment unit between the input light collimator and the output light collimator; and
a reflection axis adjustment mechanism which movably adjusts a reflection angle or a position of the reflecting member.

14. The variable dispersion compensator according to claim 1, wherein the group delay characteristic control unit changes resonator length in at least one of the plurality of the reflective etalons serving as the group delay characteristic assignment unit.

15. The variable dispersion compensator according to claim 14, wherein the group delay characteristic control unit independently changes resonator length in two or more of the plurality of the reflective etalons.

16. The variable dispersion compensator according to claim 14, wherein the group delay characteristic control unit changes the resonator length by controlling temperature of the group delay characteristic assignment unit.

17. A variable dispersion compensator, comprising:
an input light collimator which introduces input light;
a group delay characteristic assignment unit in which a reflective etalon is arranged so as to form an optical path by reflection for light introduced from the input light collimator, and which assigns variable group delay characteristics to the light by reflection on the reflective etalon;
an output light collimator which receives the light to which the variable group delay characteristics are assigned by the group delay characteristic assignment unit;
a group delay characteristic control unit which controls the group delay characteristics at the group delay characteristic assignment unit in order to perform dispersion compensation for an optical signal of the light introduced from the input light collimator;
a positioning unit which positions a relative positional relationship between an optical axis position and the output light collimator in the case where the light from the input light collimator is output toward the output light collimator through reflection on an incident side plane of the reflective etalon; and
a positioning control unit which controls the positioning unit so that the relative positional relationship becomes a positional relationship set in association with the group delay characteristics controlled by the group delay characteristic control unit.

18. A method of controlling a variable dispersion compensator which assigns group delay characteristics for dispersion compensation to light introduced from an input light collimator by reflection on a plurality of reflective etalons and leads the light to an output light collimator, the method comprising:
controlling the group delay characteristics assigned by the plurality of the reflective etalons; and
performing positioning control of a relative positional relationship between an optical axis position and the output light collimator in the case where the light from the input light collimator is output toward the output light collimator through reflection on each of incident side planes of the plurality of the reflective etalons in association with the controlled group delay characteristics.

* * * * *

UNITED STATES PATENT AND TRADEMARK OFFICE
CERTIFICATE OF CORRECTION

| | | |
|---|---|---|
| PATENT NO. | : 7,907,344 B2 | Page 1 of 1 |
| APPLICATION NO. | : 12/488667 | |
| DATED | : March 15, 2011 | |
| INVENTOR(S) | : Naoki Hashimoto | |

It is certified that error appears in the above-identified patent and that said Letters Patent is hereby corrected as shown below:

Title page Column 2 (Attorney, Agent, or Firm), Line 1 delete "Stass" and insert -- Staas --, therefor.

Signed and Sealed this
Third Day of May, 2011

David J. Kappos
*Director of the United States Patent and Trademark Office*